(12) United States Patent
Ito

(10) Patent No.: US 11,012,856 B2
(45) Date of Patent: May 18, 2021

(54) SETTING SYSTEM, SETTING APPARATUS, SETTING METHOD AND NON-TRANSITORY COMPUTER-READABLE RECORDING MEDIUM

(71) Applicant: YOKOGAWA ELECTRIC CORPORATION, Tokyo (JP)

(72) Inventor: Osamu Ito, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 204 days.

(21) Appl. No.: 16/185,637

(22) Filed: Nov. 9, 2018

(65) Prior Publication Data

US 2019/0159028 A1    May 23, 2019

(30) Foreign Application Priority Data

Nov. 22, 2017    (JP) .............................. JP2017-225127

(51) Int. Cl.
| | |
|---|---|
| *H04L 29/06* | (2006.01) |
| *H04W 12/06* | (2021.01) |
| *H04W 12/30* | (2021.01) |
| *H04W 12/047* | (2021.01) |
| *H04W 12/50* | (2021.01) |
| *H04L 29/08* | (2006.01) |
| *H04L 12/24* | (2006.01) |
| *H04W 4/80* | (2018.01) |

(52) U.S. Cl.
CPC ......... *H04W 12/06* (2013.01); *H04L 41/0806* (2013.01); *H04L 63/18* (2013.01); *H04L 67/1046* (2013.01); *H04W 12/047* (2021.01); *H04W 12/35* (2021.01); *H04W 12/50* (2021.01); *H04W 4/80* (2018.02)

(58) Field of Classification Search
CPC .... H04W 4/80; H04W 12/06; H04L 41/0806; H04L 67/1046
See application file for complete search history.

(56) References Cited

U.S. PATENT DOCUMENTS

| | | | |
|---|---|---|---|
| 2003/0009541 A1* | 1/2003 | Sato .................... | H04L 41/0213 709/220 |
| 2008/0117847 A1 | 5/2008 | Hamada | |
| 2009/0169013 A1* | 7/2009 | Fascenda ................ | G06F 21/78 380/277 |

(Continued)

FOREIGN PATENT DOCUMENTS

| | | |
|---|---|---|
| EP | 1450513 A1 | 8/2004 |
| EP | 2911434 A1 | 8/2015 |
| JP | 2013-218532 A | 10/2013 |

OTHER PUBLICATIONS

Extended European Search Report issued in European Application No. 18205396.7, dated Apr. 3, 2019 (6 pages).

*Primary Examiner* — Thaddeus J Plecha
(74) *Attorney, Agent, or Firm* — Osha Bergman Watanabe & Burton LLP

(57) ABSTRACT

A setting system including a portable medium having recorded therein setting information generated by a management apparatus that manages a wireless network and necessary for a wireless device that joins the wireless network, and a setting apparatus that acquires the setting information from the portable medium and sets the acquired setting information in the wireless device.

10 Claims, 18 Drawing Sheets

(56) References Cited

U.S. PATENT DOCUMENTS

| | | | |
|---|---|---|---|
| 2009/0260071 A1* | 10/2009 | Sadovsky | H04W 12/003 726/9 |
| 2011/0196946 A1* | 8/2011 | Manchester | H04L 41/0843 709/220 |
| 2012/0155643 A1* | 6/2012 | Hassan | H04L 67/1046 380/270 |
| 2014/0165165 A1* | 6/2014 | Story, Jr. | H04W 12/04031 726/6 |
| 2015/0236903 A1* | 8/2015 | Kodama | H04L 41/0806 370/254 |

* cited by examiner

SETTING SYSTEM, SETTING APPARATUS, SETTING METHOD AND NON-TRANSITORY COMPUTER-READABLE RECORDING MEDIUM

CROSS-REFERENCE TO RELATED APPLICATION

The present application claims the priority of Japanese Patent Application No. 2017-225127 (filed on Nov. 22, 2017) and the disclosure of the present application is incorporated herein by reference in its entirety.

TECHNICAL FIELD

The disclosure relates to a setting system, a setting apparatus, a setting method and a non-transitory computer-readable recording medium.

BACKGROUND

In recent years, systems that collect and control various kinds of information using a wireless communication technique are being constructed. For example, in plants or factories or the like, distributed control systems (DCSs) are being constructed in which field devices (measuring instruments, operation devices) capable of wireless communication called "wireless field devices" and a control apparatus that controls these apparatuses are connected together via a wireless network. Furthermore, systems that collect measurement data of a wireless sensor to a server apparatus via LPWAN (low power wide area network) which enables low power consumption long distance wireless communication are also being constructed.

Causing wireless devices such as the above-described wireless field devices or wireless sensors to join a wireless network requires authentication by a management apparatus that manages the wireless network. For this purpose, it is necessary to perform a setting operation called "provisioning" prior to causing the wireless device to join the wireless network (e.g., see PTL 1). Note that in this setting operation, setting information is set which includes information necessary for authentication and cryptographic keys for carrying out cryptographic communication.

The above-described provisioning is often performed using a setting apparatus called a "provisioning device" and examples of the method performed using the setting apparatus include the following two methods.

First method: This is a method in which the setting apparatus generates setting information, the generated setting information is written (set) from the setting apparatus to a wireless device through short distance wireless communication such as NFC (near field communication) and the generated setting information is uploaded to a management apparatus.

Second method: This is a method in which the management apparatus generates setting information, the setting information generated by the management apparatus is downloaded from the management apparatus to the setting apparatus and the setting information downloaded to the setting apparatus is written (set) to the wireless device through short distance wireless communication such as NFC.

CITATION LIST

Patent Literature

PTL 1: JP2013218532A

The aforementioned management apparatus is connected to the Internet and may manage the wireless network via the Internet. In both the case where the setting information is uploaded to the management apparatus connected to the Internet using the aforementioned first method and the case where the setting information is downloaded using the aforementioned second method, it is necessary to connect the setting apparatus to the Internet so as to make the setting apparatus communicable with the management apparatus.

However, in plants, for example, connections to the Internet are often limited from the standpoint of security and communication among the wireless device, the setting apparatus and the management apparatus may be limited to only communication via the wireless network managed by the management apparatus. In places far from inner cities such as mines, mountainous areas, the sea and construction sites where there are fewer base stations for mobile phones, wireless waves from the base stations for mobile phones do not reach, and communication with the management apparatus may be limited to only communication via a wireless network (e.g., LPWAN) managed by the management apparatus.

When such communication among the wireless device, the setting apparatus and the management apparatus is limited to only the communication via the wireless network managed by the management apparatus, for example, timing at which provisioning is performed may be before or amid the construction of the wireless network managed by the management apparatus. Therefore, communication via the wireless network may not be enabled yet, and so it is not possible to download setting information from the management apparatus via the wireless network and upload the setting information from the setting apparatus to the management apparatus. As a result, the setting information may not be set in one of the wireless device and the management apparatus, and the wireless device may not be caused to join (i.e., the wireless device does not join) the wireless network.

SUMMARY

In view of the above-described circumstances, one or more embodiments of the disclosure provide a technique that allows a wireless device to join a wireless network managed by a management apparatus even when communication with the management apparatus is limited to only communication via the wireless network managed by the management apparatus.

A setting system according to one or more embodiments is provided with a portable medium having recorded therein setting information generated by a management apparatus that manages a wireless network and necessary for a wireless device to join the wireless network, and a setting apparatus that acquires the setting information from the portable medium and sets the acquired setting information in the wireless device.

In the above-described configuration, the portable medium having recorded therein information necessary for entry of the wireless device is brought into an environment in which communication with the management apparatus is limited to only communication via the wireless network managed by the management apparatus. The setting apparatus acquires the setting information from the portable medium and sets the acquired setting information in the wireless device. Therefore, the management apparatus and the wireless device can share the same setting information. Therefore, even in the case where communication with the management apparatus is limited to only communication via the wireless network managed by the management apparatus, it is possible to cause the wireless device to join the wireless network managed by the management apparatus.

In one or more embodiments, the portable medium has recorded therein first setting information generated for each management apparatus and commonly set in the wireless device which is caused to join (i.e., the wireless device that joins) the wireless network managed by the management apparatus, and the setting apparatus may set, in the wireless device, the first setting information identified by identification information of the management apparatus that manages the wireless network into which the wireless device is joined.

In the above-described configuration, it is possible to set the setting information common in the wireless network managed by the management apparatus in the wireless device. Therefore, each management apparatus need not store the setting information for each wireless device that joins the wireless network. Thus, management of the setting information by each management apparatus is made easier and the amount of use of the storage region of each management apparatus can be reduced.

In one or more embodiments, the portable medium has recorded therein second setting information generated for each wireless device and individually set for each wireless device which is caused to join the wireless network managed by the management apparatus, and the setting apparatus may set in the wireless device, the second setting information identified by identification information of the wireless device which is caused to join the wireless network.

In the above-described configuration, it is possible to individually set the setting information for each wireless device caused to join the wireless network managed by the management device. Therefore, even when setting information of a certain wireless device is leaked and another wireless device requests to join the wireless network, the management apparatus can reject the entry. This makes it possible to improve security.

In one or more embodiments, the portable medium has recorded therein at least one of first setting information commonly set in the wireless device which is caused to join the wireless network managed by the management apparatus and second setting information individually set for each wireless device which is caused to join the wireless network managed by the management apparatus, and the setting apparatus may acquire identification information of the wireless device from the wireless device through short distance communication and set the first setting information or the second setting information in the wireless device based on the acquired identification information of the wireless device.

In the above-described configuration, the first setting information commonly set in the wireless device caused to join the wireless network managed by the management apparatus or the second setting information individually set for each wireless device caused to join the wireless network managed by the management apparatus is used as the setting information to be set in the wireless device. The setting apparatus can set the setting information in the wireless device based on the identification information of the wireless device caused to join the wireless network no matter which of the first setting information or second setting information is used. Therefore, the unit of management of the setting information to be set in the wireless device caused to join the wireless network can be defined according to the first setting information or the second setting information, and the setting information can be set in the wireless device in accordance with the management unit. Thus, when the user wants to change the setting information to be set in the wireless device, the setting information can be easily changed. Convenience can be improved in this way.

In one or more embodiments, the portable medium further has recorded therein setting instruction information for defining which of the first setting information or the second setting information is set, and the setting apparatus may set the first setting information or the second setting information in the wireless device identified by the acquired identification information according to the setting instruction information.

In the above-described configuration, the setting apparatus can set the setting information based on the identification information of the wireless device caused to join the wireless network no matter which of the first setting information or the second setting information is instructed to be set. Therefore, the setting apparatus can instruct the unit of management of the setting information to be set in the wireless device caused to join the wireless network and can set the setting information according to the instruction in the wireless device. Thus, when the user wants to change the setting information to be set in the wireless device, the setting information can be easily changed. Convenience can be improved in this way.

In one or more embodiments, the portable medium further has recorded therein time information indicating a time to delete the setting information, and the setting apparatus may acquire the time information in addition to the setting information from the portable medium and delete the setting information when the time indicated by the time information elapses after acquiring the setting information.

In the above-described configuration, the setting apparatus can acquire the time information indicating the time to delete the setting information together with the setting information from the portable medium. The setting apparatus deletes the setting information when the time indicated by the time information elapses after acquiring the setting information. In this way, the setting information does not remain in the setting apparatus. Therefore, even if the setting apparatus is used by a malicious person, it is possible to improve security.

In one or more embodiments, the setting apparatus may set a time to delete the acquired setting information in accordance with an inputted instruction and delete the setting information after the set time elapses.

In the above-described configuration, the user such as an administrator or operator can arbitrarily set the time to delete the setting information in the setting apparatus. Furthermore, the setting apparatus deletes the setting information when the time set by the user elapses from a time point at which the setting information is acquired from the portable medium. In this way, the setting information does not remain in the setting apparatus. Therefore, it is possible to set an arbitrary time, improve convenience and even if the setting apparatus is used by a malicious person, it is possible to improve security.

In one or more embodiments, the portable medium further has recorded therein measurement setting information necessary to measure a physical quantity, and the setting apparatus may acquire the measurement setting information in addition to the setting information from the portable medium and set the acquired measurement setting information in the wireless device.

In the above-described configuration, since the setting apparatus sets the measurement setting information in accordance with the physical quantity of the object to be measured, the wireless device can measure the physical quantity. The setting apparatus can easily make the same setting in a plurality of wireless devices having the same physical quantity of the object to be measured.

A setting system according to one or more embodiments is provided with a setting apparatus that generates setting information necessary for a wireless device to join a wireless network managed by a management apparatus and sets the generated setting information in the wireless device, and a portable medium having recorded, by the setting apparatus, therein the setting information generated by the setting apparatus and to be set in the management apparatus.

In the above-described configuration, the setting apparatus sets, in the wireless device, setting information necessary for entry of the wireless device and sets setting information in the management apparatus that manages the wireless network into which the wireless device is joined using the portable medium having recorded therein the setting information. Therefore, the management apparatus and the wireless device can share the same setting information. Therefore, even if communication with the management apparatus is limited to only communication via the wireless network managed by the management apparatus, the wireless device can be caused to join the wireless network managed by the management apparatus.

A setting system according to one or more embodiments is provided with an acquisition unit that acquires, from a portable medium having recorded therein setting information, the setting information generated by a management apparatus that manages a wireless network and necessary for a wireless device to join the wireless network, and a short distance communication unit that sets the setting information acquired by the acquisition unit in the wireless device.

In the above-described configuration, the setting apparatus acquires setting information from the portable medium having recorded therein the setting information and sets the acquired setting information in a wireless device disposed in an environment in which it is not possible to perform communication other than communication with the management apparatus via the wireless network. Therefore, the management apparatus and the wireless device can share the same setting information. Therefore, even if communication with the management apparatus is limited to only communication via the wireless network managed by the management apparatus, the wireless device can be caused to join the wireless network managed by the management apparatus.

A setting method according to one or more embodiments includes a recording step of recording, in a portable medium, setting information generated by a management apparatus that manages a wireless network and necessary for a wireless device to join the wireless network, an acquisition step of acquiring the setting information from the portable medium, and a setting step of setting the acquired setting information in the wireless device.

In the above-described configuration, information necessary for entry of the wireless device is recorded in an environment in which communication with the management apparatus is limited to only communication via the wireless network managed by the management apparatus. The setting information is acquired from the portable medium and the acquired setting information is set in the wireless device. Therefore, the management apparatus and the wireless device can share the same setting information. Therefore, even in the case where communication with the management apparatus is limited to only communication via the wireless network managed by the management apparatus, it is possible to cause the wireless device to join the wireless network managed by the management apparatus.

A non-transitory computer-readable recording medium including computer program instructions, which when executed by a computer, cause the computer to acquire, from a portable medium having recorded therein setting information, the setting information generated by a management apparatus that manages a wireless network and necessary for a wireless device to join the wireless network, and set the acquired setting information in the wireless device as a short distance communication unit.

In the above-described configuration, information necessary for entry of the wireless device is recorded in an environment in which communication with the management apparatus is limited to only communication via the wireless network managed by the management apparatus. The setting information is acquired from the portable medium and the acquired setting information is set in the wireless device. Therefore, the management apparatus and the wireless device can share the same setting information. Therefore, even in the case where communication with the management apparatus is limited to only communication via the wireless network managed by the management apparatus, it is possible to cause the wireless device to join the wireless network managed by the management apparatus.

DETAILED DESCRIPTION

Hereinafter, one or more embodiments will be described with reference to the accompanying drawings.

Figure 1:
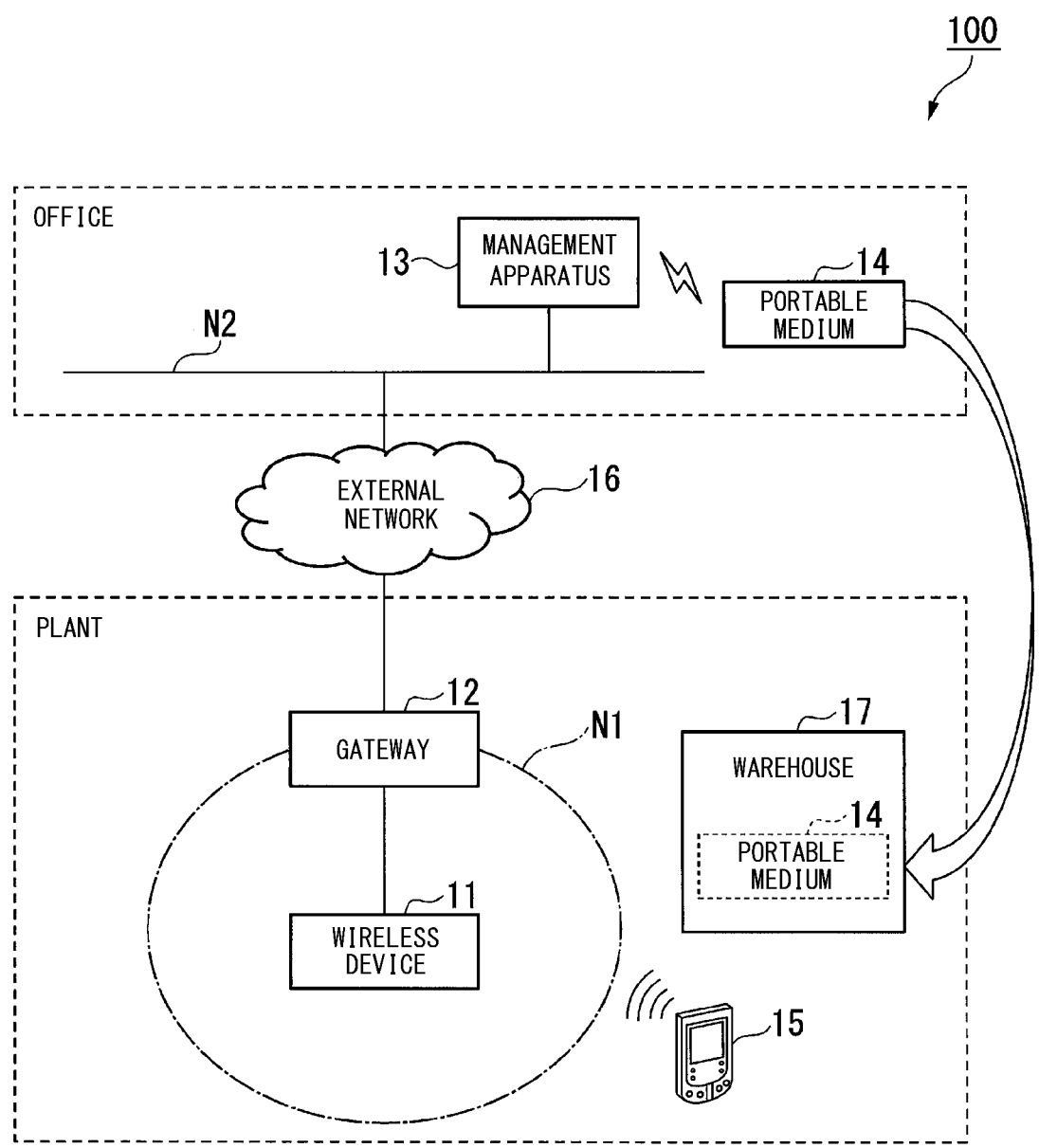
FIG. 1 is a block diagram illustrating an overall configuration of a setting system according to one or more embodiments.

FIG. 1 is a block diagram illustrating an overall configuration of a setting system 100 according to one or more embodiments. The setting system 100 is provided with a wireless device 11, a gateway 12, a management apparatus 13, a portable medium 14 and an information terminal apparatus 15 (setting apparatus). The setting system 100 can perform wireless communication under a TDMA (time division multiple access) scheme via a wireless network N1.

In FIG. 1, the wireless device 11 and the gateway 12 are installed at the site of a plant and the management apparatus 13 is installed at a place different from the plant site (e.g., office). The wireless device 11 is a wireless device planned to be caused to join (i.e., wireless device that joins) the wireless network N1 from now. The gateway 12 and the management apparatus 13 are connected together so as to be communicable via an external network 16. The external network 16 is, for example, the Internet.

The wireless network N1 is a wireless network formed by the gateway 12 installed at the site of the plant and managed by the management apparatus 13. Examples of the plant here include an industrial plant such as a chemical plant, a well source such as a gas field or an oil field, a plant that manages/controls their periphery, a plant that manages/controls hydroelectric, thermal or atomic power generation, a plant that manages/controls environmental power generation such as solar or wind power, a plant that manages/controls water/sewage or dam. Note that although FIG. 1 illustrates a case where the wireless device 11, gateway 12 and management apparatus 13 are provided one each for simplicity of description, the number of wireless devices 11, gateways 12 and management apparatuses 13 each can be two or more. When the number of management apparatuses 13 is plural, the respective management apparatuses 13 manage different wireless networks.

In one or more embodiments, communication other than communication via the wireless network N1 cannot be performed among the wireless device 11, the information terminal apparatus 15 and the management apparatus 13 within the plant. Therefore, the wireless device 11 or the information terminal apparatus 15 is a wireless device or a setting apparatus installed or used in an environment in which communication other than communication via the wireless network N1 in communication with the management apparatus 13 cannot be carried out.

The wireless device 11 is a field device installed at the site of the plant to perform measurement or operation necessary for process control under the control of the management apparatus 13. Examples of the wireless device 11 include a sensor device such as a flow meter or temperature sensor, a valve device such as flow rate control valve or on-off valve, actuator device such as a fan or motor, other field devices installed at the site of a plant or factory. The wireless device 11 performs battery-powered power-saving operation (e.g., intermittent operation) and can perform wireless communication under a TDMA scheme compliant with wireless communication standard ISA100.11a which is an industrial automation wireless communication standard.

Furthermore, the wireless device 11 is provided with a function of performing communication via NFC (near field communication: short distance communication) in addition to the aforementioned wireless communication. NFC, here, means communication (non-contact communication) where the distance between communicating apparatuses is, for example, several tens of cm or less, and NFC also includes communication carried out with the casings of communicating apparatuses being in contact with each other. NFC allows power to be supplied from one communicating apparatus to the other in a non-contact state. Such an NFC-enabled wireless device 11 can communicate with the information terminal apparatus 15 such as an NFC-enabled smartphone, tablet-type computer or notebook computer.

The wireless device 11 carries out short distance communication with the information terminal apparatus 15 and acquires information necessary to join the wireless network N1. Note that examples of the information necessary to join the wireless network N1 in one or more embodiments include a network ID assigned to the wireless network N1, a join key corresponding to a password necessary at the time of entry or cryptographic key used to perform cryptographic communication. The cryptographic key is generated by the management apparatus 13 that manages the wireless network N1. In the following description, the information necessary for entry into the wireless network N1 will be described as "setting information."

The gateway 12 connects the wireless network N1 and a network N2 via the external network 16 and relays various kinds of data transmitted/received between the wireless device 11 and the management apparatus 13. Provision of the gateway 12 allows the wireless network N1 and the network N2 to be mutually connected while maintaining security.

The management apparatus 13 controls wireless communication carried out via the wireless network N1. More specifically, the management apparatus controls allocation of communication resources (time slot and communication channel) to the wireless device 11 and the gateway 12 to implement wireless communication under a TDMA scheme via the wireless network N1. Furthermore, the management apparatus 13 performs processing (entry processing) as to whether or not to allow the wireless device 11 to join the wireless network N1. The management apparatus 13 generates setting information necessary to cause the wireless device 11 to join the wireless network N1 and records the generated setting information in the portable medium 14.

The portable medium 14 is a portable medium having recorded therein the setting information generated by the management apparatus 13. Examples of the portable medium 14 include non-contact IC card, power of which is supplied from outside via NFC, magnetic card, USB (universal serial bus) memory, portable information processing apparatus such as a notebook computer, tablet terminal or smartphone and medium in which code information is printed such as barcode, QR Code® (QR code is a registered trademark in Japan, other countries, or both) or the like. A case will be described below as an example where the portable medium 14 is a non-contact IC card.

With the setting information generated by the management apparatus 13 recorded therein, the portable medium 14 is carried into the plant by an administrator working in an office or an operator working in the plant. The portable medium 14 carried into the plant is stored in a warehouse 17 installed in the plant. The warehouse 17 is a storage secured with a key, a password or the like.

The information terminal apparatus 15 is an apparatus carried by an operator in the plant, acquires setting information from the portable medium 14, writes the acquired setting information to the wireless device 11 and thereby sets the setting information. The information terminal apparatus 15 is an information processing apparatus such as NFC-enabled smartphone, tablet-type computer or notebook computer.

Figures 2, 3A, 3B:
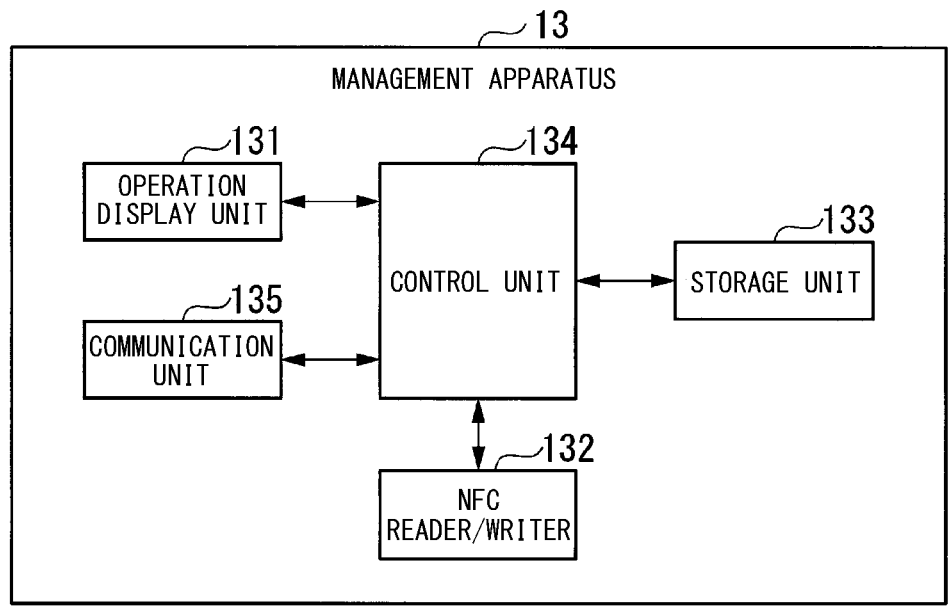
FIG. 2 is a schematic block diagram illustrating a functional configuration of a management apparatus according to one or more embodiments.
FIG. 3A is a diagram illustrating a specific example of a table generated by a control unit.
FIG. 3B is a diagram illustrating a specific example of a table generated by the control unit.

FIG. 2 is a schematic block diagram illustrating a functional configuration of the management apparatus 13 according to one or more embodiments. The management apparatus 13 is provided with an operation display unit 131, an NFC reader/writer 132, a storage unit 133, a control unit 134 and a communication unit 135.

The operation display unit 131 is provided with, for example, a touch panel type liquid crystal display apparatus combining a display function and an operation function, displays various kinds of information outputted from the control unit 134 and outputs, when an operation on the display surface of the liquid crystal display apparatus is performed, an operation signal corresponding to the operation to the control unit 134. Note that the operation display unit 131 may be physically separated into a display function and an operation function such as a liquid crystal display apparatus and a keyboard.

The NFC reader/writer 132 is provided with an antenna (not illustrated) and supplies power to the portable medium 14 in a non-contact state. Furthermore, the NFC reader/writer 132 carries out NFC with the portable medium 14 and writes setting information to the portable medium 14.

The storage unit 133 stores various kinds of information. For example, the storage unit 133 stores setting information to be set in the wireless device 11. The storage unit 133 is made up of a non-volatile memory such as a flash ROM (read only memory) or EEPROM (electrically erasable and programmable ROM).

The control unit 134 generates setting information. Furthermore, the control unit 134 performs control (display control and input control) on the operation display unit 131 and also controls the NFC reader/writer 132 to control writing of the setting information to the portable medium 14.

Furthermore, the control unit 134 generates a cryptographic key in accordance with an instruction from the administrator. More specifically, the control unit 134 generates a cryptographic key common to the wireless device 11 caused to join the wireless network N1 managed by the management apparatus 13 (hereinafter referred to as a "first cryptographic key") or a cryptographic key specific to each wireless device 11 caused to join the wireless network N1 (hereinafter referred to as a "second cryptographic key").

The cryptographic key common to the wireless device 11 caused to join the wireless network N1 managed by the management apparatus 13 is, for example, a cryptographic key commonly used on the wireless network N1 when the wireless network managed by the management apparatus 13 is the wireless network N1.

The communication unit 135 is an interface that communicates with the gateway 12.

Note that the control unit 134 is constructed of a processor such as a CPU (central processing unit). The control unit 134 executes the above-described processing by running a program. The program run by the control unit 134 may be recorded in a computer-readable recording medium. Examples of the computer-readable recording medium include a portable medium such as a flexible disk, a magneto-optical disk, a ROM or a CD-ROM, a storage apparatus such as a hard disk incorporated in the computer system. The program may also be transmitted/received via an electric communication channel.

Next, a method of generating a first cryptographic key and a second cryptographic key will be described.

A method of generating a first cryptographic key will be described first. The control unit 134 generates the first cryptographic key according to a key generation algorithm under a predetermined encryption scheme using identification information of the management apparatus 13 and random numbers. As the predetermined encryption scheme, for example, a common cryptographic key scheme is used.

The control unit 134 may store identification information of each management apparatus 13 used to generate the first cryptographic key in advance or acquire the identification information through an input via the operation display unit 131. The control unit 134 associates the generated first cryptographic key with the identification information of the management apparatus 13 used to generate the first cryptographic key to generate a table (hereinafter referred to as "NM-cryptographic key registration table") with which the identification information of the management apparatus 13 is registered in association with the first cryptographic key.

The control unit 134 generates first setting information on each piece of identification information of the management apparatus 13 by associating a join key and a network ID with each piece of identification information of the management apparatus 13 in the NM-cryptographic key registration table. Thus, the first setting information is information in which the identification information of the management apparatus 13, the first cryptographic key, the join key and the network ID are at least associated with each other. The join key for each piece of identification information of the management apparatus 13 is generated by the control unit 134. That is, the control unit 134 generates a join key to be associated with each piece of identification information of the management apparatus 13. Note that join keys for the respective pieces of identification information of the management apparatus 13 may be identical or different.

Next, the method of generating a second cryptographic key will be described. The control unit 134 generates a second cryptographic key according to a key generation algorithm under a predetermined encryption scheme using the identification information of the wireless device 11 and random numbers.

The control unit 134 may store the identification information of each wireless device 11 used to generate the second cryptographic key in advance or may acquire the identification information through an input via the operation display unit 131. The control unit 134 generates a table (hereinafter referred to as a "device-cryptographic key registration table") in which the identification information of the wireless device 11 is registered in association with the second cryptographic key by associating the generated second cryptographic key with the identification information of the wireless device 11 used to generate the second cryptographic key.

The control unit 134 generates second setting information on each piece of identification information of the wireless device 11 by associating a join key and a network ID with each piece of identification information of the wireless device 11 in the device-cryptographic key registration table. Thus, the second setting information is information in which the identification information of the wireless device 11, the second cryptographic key, the join key and the network ID are at least associated with each other. A join key for each piece of identification information of the wireless device 11 is generated by the control unit 134. That is, the control unit 134 generates a join key to be associated with each piece of identification information of the wireless device 11. Note that join keys of the respective pieces of identification information of the wireless device 11 may be identical or different.

FIG. 3A and FIG. 3B are diagrams illustrating specific examples of tables generated by the control unit 134. FIG. 3A illustrates a specific example of the NM-cryptographic key registration table 20 and FIG. 3B illustrates a specific example of the device-cryptographic key registration table 21.

First, the NM-cryptographic key registration table 20 will be described. The NM-cryptographic key registration table 20 includes a plurality of records. The records include values of NMID and first cryptographic key. The value of NMID is identification information to identify the management apparatus 13. The value of the first cryptographic key is a cryptographic key necessary for the wireless device 11 to join the network, and is a cryptographic key common to the wireless device 11 to join into the wireless network N1 managed by the management apparatus 13, generated using the identification information of the management apparatus 13 and random numbers. That is, the first cryptographic key is a cryptographic key, the value of which is specific to the management apparatus 13.

In the example illustrated in FIG. 3A, a plurality of NMIDs are registered with the NM-cryptographic key registration table 20. In FIG. 3A, in the record on the topmost stage of the NM-cryptographic key registration table 20, the value of NMID is "NM1" and the value of the first cryptographic key is "Sdkpvd46emdk." That is, the table depicts that the cryptographic key common to the wireless device 11 which has joined the network managed by the management apparatus 13 identified by NMID "NM1" is "Sdkpvd46emdk."

Next, the device-cryptographic key registration table 21 will be described. The device-cryptographic key registration table 21 includes a plurality of records. Each record has values of the device ID and the second cryptographic key. The value of the device ID is identification information to identify the wireless device 11. That is, the value of the device ID is "EUI64" which is 64-bit identification information assigned to each wireless device 11 in advance to uniquely identify the wireless device 11. The value of the second cryptographic key is a cryptographic key necessary for the wireless device 11 to join the network, and is a cryptographic key specific to each wireless device 11 to be caused to join the wireless network N1. That is, the value of the second cryptographic key is specific to the wireless device 11.

In the example illustrated in FIG. 3B, a plurality of NMIDs are registered with the device-cryptographic key registration table 21. In FIG. 3B, in the record on the topmost stage of the device-cryptographic key registration table 21, the value of the device ID is "device 1," the value of the second cryptographic key is "Owuxjrhgltpwp5f8." That is, the table depicts that the cryptographic key necessary for the wireless device 11 identified by the device ID "device 1" to join the network is "Owuxjrhgltpwp5f8."

Figure 4:
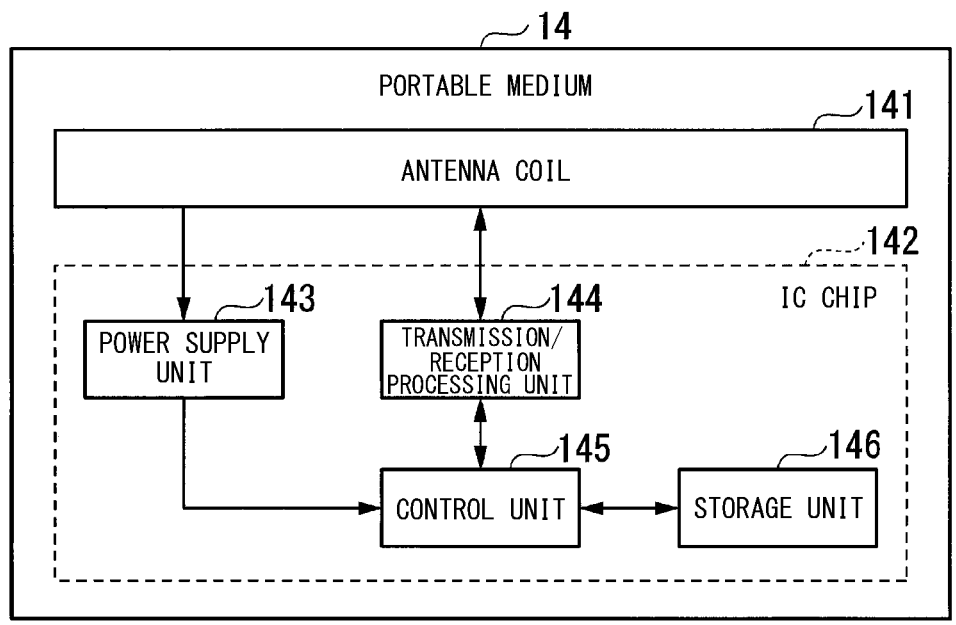
FIG. 4 is a schematic block diagram illustrating a functional configuration of a portable medium according to one or more embodiments.

FIG. 4 is a schematic block diagram illustrating a functional configuration of the portable medium 14 according to one or more embodiments. The portable medium 14 is provided with an antenna coil 141 and an IC chip 142. Note that FIG. 4 illustrates a configuration when the portable medium 14 is an IC card.

The antenna coil 141 carries out communication with the antenna of the opposite apparatus.

The IC chip 142 is provided with a power supply unit 143, a transmission/reception processing unit 144, a control unit 145 and a storage unit 146. The power supply unit 143 supplies the power supplied from the outside to each function in the IC chip 142.

The transmission/reception processing unit 144 performs transmission processing on data to the opposite apparatus and reception processing on data transmitted from the opposite apparatus via the antenna coil 141. Examples of the transmission processing include modulation processing and power amplification. Examples of the reception processing include demodulation processing.

The control unit 145 operates with the power supplied from the power supply unit 143, and oversees and controls operation of the portable medium 14. For example, the control unit 145 controls the transmission/reception processing unit 144 to transmit setting information stored in the storage unit 146. The control unit 145 causes the storage unit 146 to store setting information received via the transmission/reception processing unit 144.

The storage unit 146 is a non-volatile memory and stores the setting information.

Figure 5:
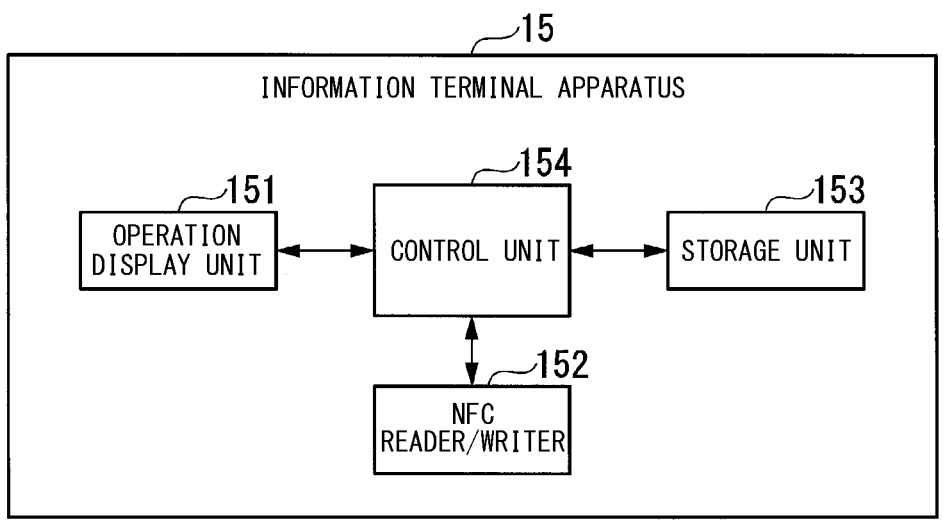
FIG. 5 is a schematic block diagram illustrating a functional configuration of an information terminal apparatus according to one or more embodiments.

FIG. 5 is a schematic block diagram illustrating a functional configuration of the information terminal apparatus 15 according to one or more embodiments. The information terminal apparatus 15 is provided with an operation display unit 151, an NFC reader/writer 152 (short distance communication unit), a storage unit 153 and a control unit 154.

The operation display unit 151 is provided with a touch panel type liquid crystal display apparatus combining, for example, a display function and an operation function, displays various kinds of information outputted from the control unit 154 and outputs, when operation is conducted on the display surface of the liquid crystal display apparatus, an operation signal corresponding to the operation to the control unit 154. Note that the operation display unit 151 may also be physically separated into a display function and an operation function such as a liquid crystal display apparatus and a keyboard.

The NFC reader/writer 152 is provided with an antenna (not illustrated) and supplies power to the portable medium 14 in a non-contact state. Furthermore, the NFC reader/writer 152 performs NFC with the portable medium 14 to read data from the portable medium 14. For example, the NFC reader/writer 152 performs NFC with the portable medium 14 to read setting information from the portable medium 14. The NFC reader/writer 152 (acquisition unit) acquires the setting information by reading the setting information from the portable medium 14.

The NFC reader/writer 152 supplies power to an external device (e.g., adjacently disposed wireless device 11) in a non-contact state. The NFC reader/writer 152 performs NFC with an external device to read data from the external device or write data to the external device. For example, the NFC reader/writer 152 performs NFC with the external device to read identification information from the external device or write setting information to the external device.

The storage unit 153 stores various kinds of information. For example, the storage unit 153 stores setting information to be set in the wireless device 11. The storage unit 153 is constructed of a non-volatile memory such as a flash ROM or EEPROM.

The control unit 154 controls (display control and input control) the operation display unit 151 and controls the NFC reader/writer 152 to read data from the portable medium 14 and the external device or write data to the external device.

Figure 6:
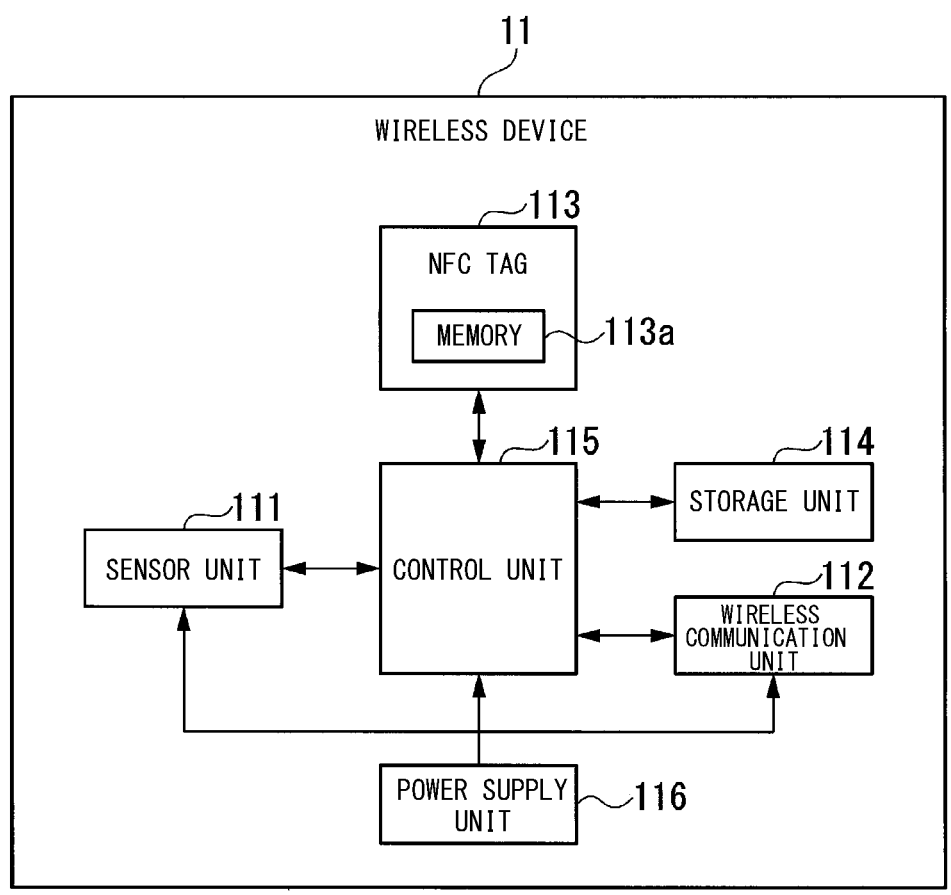
FIG. 6 is a schematic block diagram illustrating a functional configuration of a wireless device according to one or more embodiments.

FIG. 6 is a schematic block diagram illustrating a functional configuration of the wireless device 11 according to one or more embodiments. The wireless device 11 is provided with a sensor unit 111, a wireless communication unit 112, an NFC tag 113, a storage unit 114, a control unit 115 and a power supply unit 116, and performs operation in accordance with the setting information stored in the NFC tag 113.

The sensor unit 111 operates with the power supplied from the power supply unit 116 and measures objects to be measured (e.g., flow rate or temperature) under the control of the control unit 115.

As with the sensor unit 111, the wireless communication unit 112 operates with the power supplied from the power supply unit 116 and performs wireless communication via the wireless network N1 under the control of the control unit 115. For example, the wireless communication unit 112 transmits measurement results of the sensor unit 111 (e.g., measurement results of flow rate and temperature) to the management apparatus 13 via the wireless network N1. Note that the wireless communication unit 112 performs wireless communication compliant with the aforementioned wireless communication standard ISA100.11a.

The NFC tag 113 is provided with an antenna (not illustrated) and a memory 113a, operates with the power supplied from the external device (e.g., information terminal apparatus 15) and performs NFC with the external device. The memory 113a provided in the NFC tag 113 is, for example, a non-volatile memory mounted as an IC chip and operates with the power supplied from the outside. Various kinds of setting information set in the wireless device 11 are stored in the memory 113a. Note that the memory 113a may also be provided outside the NFC tag 113.

The NFC tag 113 operates with the power supplied from the information terminal apparatus 15 disposed adjacently (disposed at a distance on the order of several tens of cm or less). When a data read request is transmitted from the information terminal apparatus 15 disposed adjacently, the NFC tag 113 reads the data stored in the memory 113a and transmits the data to the information terminal apparatus 15. On the other hand, when a data write request is transmitted from the information terminal apparatus 15 disposed adjacently, the NFC tag 113 writes the data (data to be written) transmitted from the information terminal apparatus 15 to the memory 113a.

The NFC tag 113 causes the control unit 115 to shift to a sleep state (low power consumption state) or cancels the sleep state of the control unit 115 according to the data received via NFC. To be more specific, the NFC tag 113 outputs a sleep signal or a sleep cancellation signal to the control unit 115 according to the received data to thereby cause the control unit 115 to shift to a sleep state or cancel the sleep state of the control unit 115.

When the sleep state of the control unit 115 is cancelled, the NFC tag 113 supplies part of the power supplied from the information terminal apparatus 15 to the control unit 115 and outputs the above-described sleep cancellation signal to the control unit 115. Note that along with the shift to the sleep state, the control unit 115 may cause at least one of the sensor unit 111, the wireless communication unit 112 and the storage unit 114 to shift to the sleep state, and along with sleep cancellation, the control unit 115 may cancel the sleep state of at least one of the sensor unit 111, the wireless communication unit 112 and the storage unit 114.

The storage unit 114 is provided with a non-volatile memory such as a flash ROM or EEPROM to store various kinds of information. For example, the storage unit 114 temporarily stores the measurement result of the sensor unit 111. Note that when the memory 113a of the NFC tag 113 is provided outside, the storage unit 114 may also function as the memory 113a.

The control unit 115 operates with the power supplied from the power supply unit 116, and oversees and controls operation of the wireless device 11. For example, the control unit 115 controls the sensor unit 111 to measure an object to be measured and controls the wireless communication unit 112 to transmit the measurement result of the sensor unit 111. Furthermore, the control unit 115 makes various types of settings using, for example, the setting information stored in the memory 113a of the NFC tag 113. For example, the control unit 115 makes a setting or the like to cause the wireless device 11 to join the wireless network N1. The control unit 115 controls the sensor unit 111 and the wireless communication unit 112 to perform power-saving operation (e.g., intermittent operation). The control unit 115 shifts to a sleep state based on a control signal from, for example, the NFC tag 113.

The power supply unit 116 is provided with a power supply (not illustrated) that supplies power and a power supply circuit (not illustrated) that converts power from power supply to power suitable for use in the sensor unit 111, the wireless communication unit 112, the storage unit 114 and the control unit 115, and supplies power to the respective units of the wireless device 11 under the control of the control unit 115. Here, a battery (e.g., primary battery or secondary battery with extremely little self-discharge such as lithium thionyl chloride battery), fuel battery, capacitor or a power generation circuit that performs environmental power generation (so-called, energy harvest such as solar battery) can be used as the above-described power supply.

Note that when the wireless device 11 is an actuator device, the wireless device 11 has a configuration substantially similar to the configuration of the wireless device 11 illustrated in FIG. 6 except the sensor unit 111 illustrated in FIG. 6. That is, when the wireless device 11 is an actuator device, it has a configuration in which an actuator unit that performs various kinds of operation is provided instead of the sensor unit 111 provided for the wireless device 11 illustrated in FIG. 6. When the wireless device 11 is an actuator device, the actuator device can perform NFC in addition to wireless communication via the wireless network N1 as with the wireless device 11. Note that the wireless device 11 may be provided with the sensor unit 111 that measures a surrounding state quantity (e.g., in the case of an on-off valve, pressure of air supplied to the valve).

Figure 7:
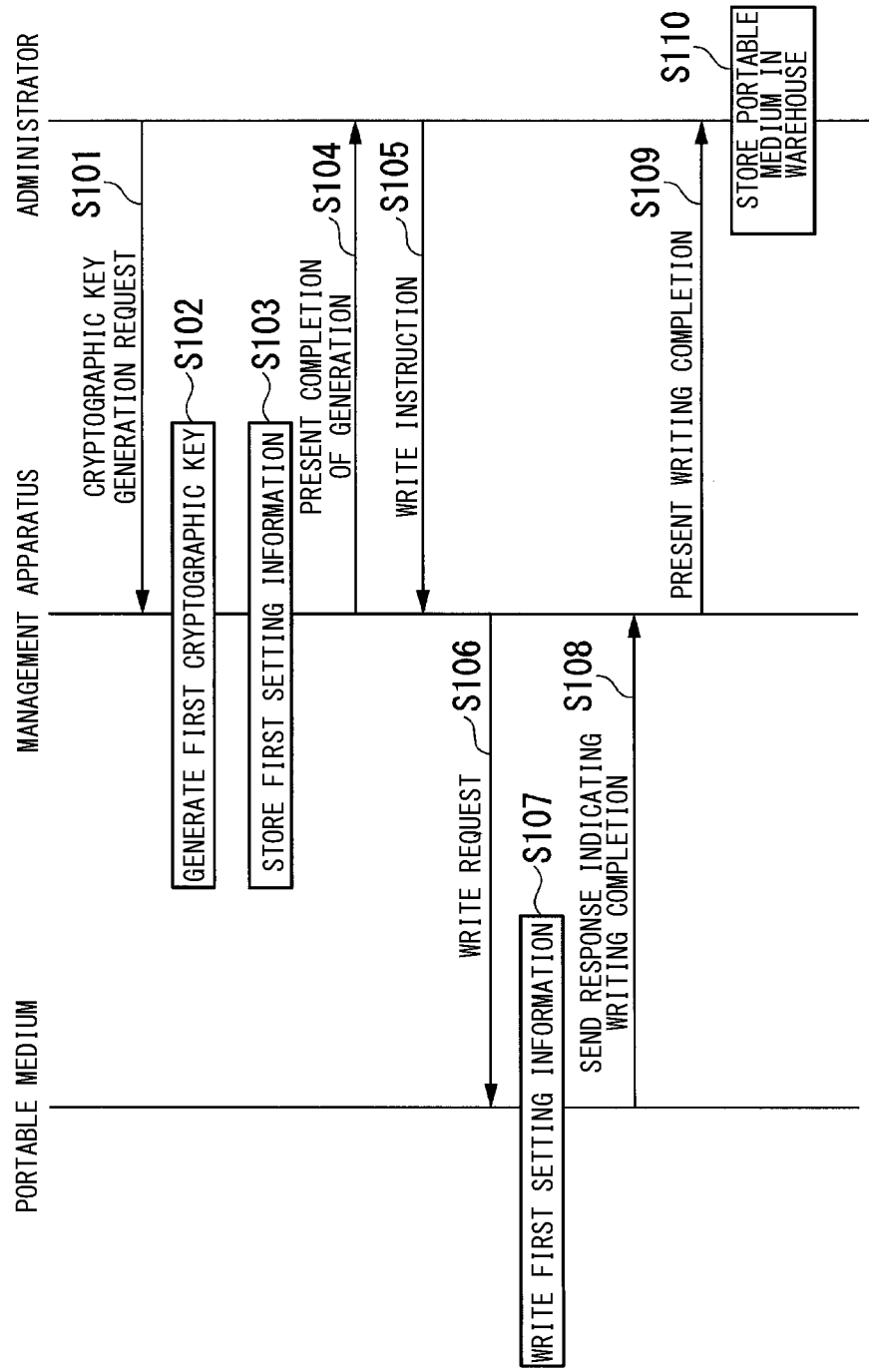
FIG. 7 is a sequence diagram illustrating a processing flow of writing setting information to a portable medium of a setting system according to one or more embodiments.

FIG. 7 is a sequence diagram illustrating a processing flow of writing setting information to the portable medium 14 of the setting system 100 according to one or more embodiments. A case will be described in FIG. 7 where the person who operates the management apparatus 13 is an administrator as an example, but the person who operates the management apparatus 13 may be an operator. Furthermore, a case will be described in FIG. 7 as an example where first setting information is written to the portable medium 14.

First, the administrator operates the operation display unit 131 of the management apparatus 13 to request generation of a cryptographic key (step S101). Suppose the administrator instructs generation of the first cryptographic key. The control unit 134 of the management apparatus 13 generates the first cryptographic key using identification information of the management apparatus 13 and random numbers according to the request to generate the cryptographic key (step S102). For example, the control unit 134 generates a plurality of first cryptographic keys using identification information stored in the own apparatus or the inputted identification information of the management apparatus 13 respectively.

The control unit 134 generates the NM-cryptographic key registration table 20 by associating the generated first cryptographic key with the identification information of the management apparatus 13. The control unit 134 generates a join key for each piece of identification information of the management apparatus 13 and causes the storage unit 133 to store first setting information on each piece of identification information of the management apparatus 13 in which the generated join key, the network ID and the first cryptographic key are associated with the identification information of the management apparatus 13 (step S103).

The control unit 134 presents to the administrator, information that generation of the cryptographic key is completed (step S104). For example, the control unit 134 controls the operation display unit 131 to display the information that generation of the cryptographic key is completed. Next, the administrator brings the portable medium 14 closer to the management apparatus 13 to instruct the management apparatus 13 to write the setting information. For example, the administrator operates the management apparatus 13 to instruct writing setting information via NFC (step S105).

When the instruction of writing of the setting information is given, the control unit 134 reads all the first setting information stored in the storage unit 133. Next, the control unit 134 controls the NFC reader/writer 132 to supply power to the portable medium 14 and transmit a data write request and data to be written (read first setting information) to the portable medium 14 (step S106).

When the data write request is received, the control unit 145 of the portable medium 14 writes the first setting information which is the data to be written to the storage unit 146 (step S107). When the data write is completed, the control unit 145 controls the transmission/reception processing unit 144 to send a response notifying the completion of writing to the management apparatus 13 (step S108).

Upon acquiring the response notifying the completion of writing from the portable medium 14, the control unit 134 of the management apparatus 13 presents to the administrator, the information that the write to the portable medium 14 is completed (step S109). For example, the control unit 134 controls the operation display unit 131 to display the information that the write to the portable medium 14 is completed. After that, the administrator carries the portable medium 14 having recorded therein the first setting information and stores the portable medium 14 in the warehouse 17 in the plant (step S110).

Through the above-described processing, the portable medium 14 having recorded therein the first setting information on each piece of identification information of the management apparatus 13 is carried into the site of the plant.

Figure 8:
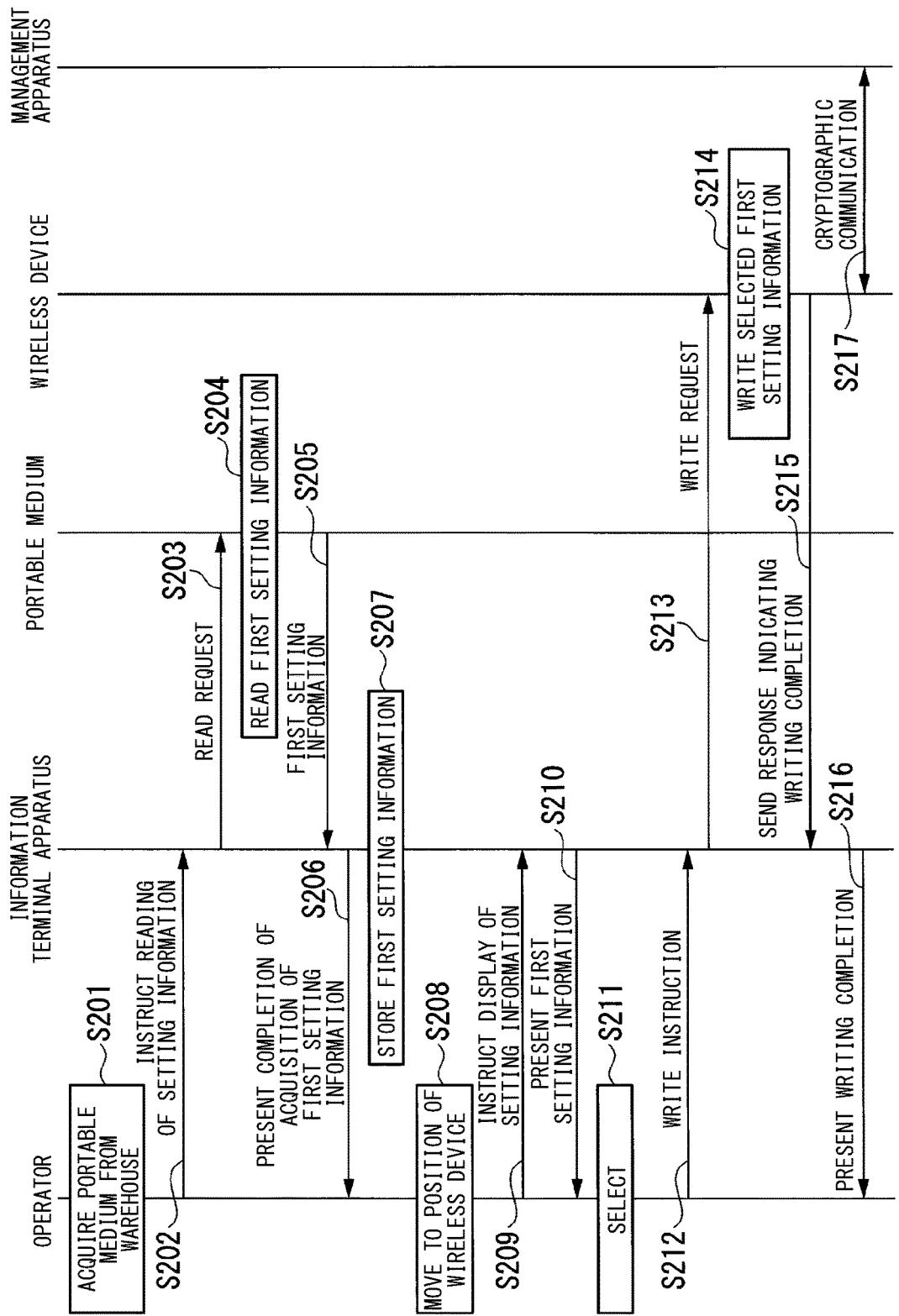
FIG. 8 is a sequence diagram illustrating a processing flow of writing setting information to the wireless device of the setting system according to one or more embodiments.

FIG. 8 is a sequence diagram illustrating a processing flow of writing setting information to the wireless device 11 of the setting system 100 according to one or more embodiments.

The operator takes the portable medium 14 out from the warehouse 17 (step S201). The operator operates the information terminal apparatus 15 he/she carries to instruct reading of the setting information (step S202). At this time, the operator brings the portable medium 14 and the information terminal apparatus 15 closer to positions at which they can communicate with each other via NFC. When a setting information reading instruction is given, the control unit 154 of the information terminal apparatus 15 controls the NFC reader/writer 152 to supply power to the portable medium 14 and transmit a data read request to the portable medium 14 (step S203).

When the data read request is received, the control unit 145 of the portable medium 14 reads all the first setting information on each piece of identification information of the management apparatus 13 stored in the storage unit 146 (step S204). The control unit 145 controls the transmission/reception processing unit 144 to transmit the read first setting information to the information terminal apparatus 15 (step S205).

The NFC reader/writer 152 of the information terminal apparatus 15 receives the first setting information transmitted from the portable medium 14. When the first setting information is received, the control unit 154 presents information that the acquisition of the first setting information is completed (step S206). For example, the control unit 154 controls the operation display unit 151 to display information that the acquisition of the first setting information is completed. The control unit 154 causes the storage unit 153 to store the first setting information received via the NFC reader/writer 152 (step S207).

When the acquisition of the first setting information is completed, the operator stores the portable medium 14 in the warehouse 17 first. After that, the operator carries the information terminal apparatus 15 and moves to the position of the wireless device 11 to be caused to join the wireless network N1 (step S208). The operator operates the information terminal apparatus 15 he/she carries to instruct display of the setting information (step S209).

The control unit 154 of the information terminal apparatus 15 controls the operation display unit 151 to present the setting information in accordance with the instruction of display of the setting information (step S210). More specifically, the control unit 154 acquires an ID (e.g., NMID) associated with the cryptographic key from the first setting information stored in the storage unit 153. Next, the control unit 154 generates screen information including the acquired ID and causes the operation display unit 151 to display the generated screen information. For example, the control unit 154 generates the screen information illustrated in FIG. 9 and causes the operation display unit 151 to display the generated screen information.

Figure 9:
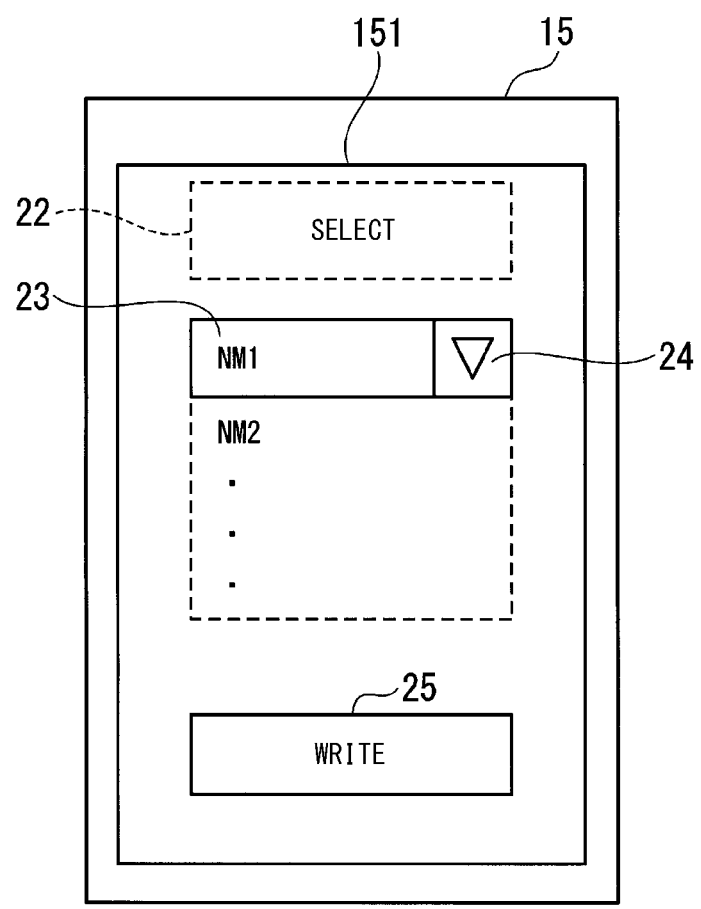
FIG. 9 is a diagram illustrating an example of a screen displayed on the information terminal apparatus when setting information is set in the wireless device.

FIG. 9 is a diagram illustrating an example of a screen displayed on the information terminal apparatus 15 when the setting information is set in the wireless device 11. The screen illustrated in FIG. 9 displays an instruction 22 to the operator, a display region 23 to display an ID, a display button 24 to display other IDs not displayed in the display region 23 and an execution button 25 to execute writing of the setting information. When the operator selects the display button 24, the control unit 154 displays other IDs not displayed in the display region 23 on pull-down menus. When the operator selects the execution button 25, the first setting information associated with the ID specified by the operator is written to the wireless device 11.

Returning to FIG. 8, the operator selects an ID relating to the wireless device 11 to be caused to join the wireless network N1 (ID of the management apparatus 13 that manages the wireless network N1 which the wireless device 11 is caused to join) from among IDs displayed in the display region 23 displayed on the screen illustrated in FIG. 9 or displayed on pull-down menus (step S211). For example, the operator references a list presenting which wireless network the wireless device 11 is caused to join and specifies the wireless network which the wireless device 11 is caused to join.

The operator then selects the ID of the management apparatus 13 that manages the specified wireless network. After that, the operator operates the information terminal apparatus 15, selects the execution button 25 to instruct writing (step S212). At this time, the operator brings the wireless device 11 and the information terminal apparatus 15 closer to positions at which they can communicate with each other via NFC.

When a write instruction is given, the control unit 154 of the information terminal apparatus 15 acquires the first setting information corresponding to the ID selected by the operator (e.g., NMID, first cryptographic key, network ID and join key) from the storage unit 153. The control unit 154 controls the NFC reader/writer 152 to transmit a data write request and data to be written (first setting information acquired from the storage unit 153) to the wireless device 11 (step S213).

When the data write request is received, the control unit 115 of the wireless device 11 writes the first setting information which is the data to be written to the storage unit 114 (step S214). When the data write is completed, the control unit 115 controls the NFC tag 113 to send a response notifying the information terminal apparatus 15 of the completion of writing (step S215).

When the response indicating the completion of writing is obtained from the wireless device 11, the control unit 154 of the information terminal apparatus 15 presents to the operator, the information that the writing of the first setting information to the wireless device 11 is completed (step S216). For example, the control unit 154 controls the operation display unit 151 to display the information that the writing of the first setting information to the wireless device 11 is completed.

When registration of the first setting information with the wireless device 11, that is, provisioning is completed, the wireless device 11 executes connection processing with the gateway 12. When the connection between the wireless device 11 and the gateway 12 is completed, the wireless device 11 performs cryptographic communication with the management apparatus 13 (step S217). More specifically, the wireless device 11 encrypts information used for authentication such as the identification information of the wireless device 11 and a join key using the cryptographic key stored in the storage unit 114. The wireless device 11 transmits the encrypted information to the management apparatus 13.

The control unit 134 of the management apparatus 13 authenticates the wireless device 11 based on the information transmitted from the wireless device 11. More specifically, the control unit 134 authenticates the wireless device 11 by decoding the information transmitted from the wireless device 11 using the cryptographic key possessed by the own apparatus. For example, if the first cryptographic key has been generated in the process of step S102, the control unit 134 decodes the information transmitted from the wireless device 11 using the first cryptographic key. When the decoding is successful, the control unit 134 performs processing for entry into the wireless network N1 using the join key.

On the other hand, when the decoding is not successful, the control unit 134 does not allow the wireless device 11 to join the wireless network N1.

Note that when the second setting information is written to the portable medium 14, the following processing is performed in FIG. 7 and FIG. 8. Note that only differences from the case where the first setting information is written to the portable medium 14 will be described here.

First, in FIG. 7, the management apparatus 13 generates the second cryptographic key instead of generating the first cryptographic key in the process of step S102. For example, the control unit 134 generates a plurality of second cryptographic keys using the respective pieces of identification information of the wireless device 11. Next, the control unit 134 generates the device-cryptographic key registration table 21 by associating the generated second cryptographic key with the identification information of the wireless device 11. Next, the control unit 134 generates a join key for each piece of identification information of the wireless device 11 in the process of step S103 and causes the storage unit 133 to store the second setting information on each piece of the identification information of the wireless device 11 in which the generated join key, the network ID, and the second cryptographic key are associated with the identification information of the wireless device 11.

After that, when a setting information write instruction is given in the process of step S106, the control unit 134 reads all the second setting information stored in the storage unit 133. Next, the control unit 134 controls the NFC reader/writer 132, supplies power to the portable medium 14 and causes the portable medium 14 to transmit a data write request and the data to be written (read second setting information). When the data write request is received in the process of step S107, the control unit 145 of the portable medium 14 writes the second setting information which is the data to be written to the storage unit 146.

In FIG. 8, when a data read request is received in the process of step S204, the control unit 145 of the portable medium 14 reads all the second setting information on each piece of identification information of the wireless device 11 stored in the storage unit 146. The control unit 145 controls the transmission/reception processing unit 144 in the process of step S205 to transmit the read second setting information to the information terminal apparatus 15. The NFC reader/writer 152 of the information terminal apparatus 15 receives the second setting information transmitted from the portable medium 14 in the process of step S205. When the second setting information is received in the process of step S206, the control unit 154 presents information that the acquisition of the second setting information is completed. In the process of step S207, the control unit 154 causes the storage unit 153 to store the second setting information received via the NFC reader/writer 152.

After that, in the process of step S210, the control unit 154 of the information terminal apparatus 15 controls the operation display unit 151 to present the setting information in accordance with the instruction of display of the setting information. More specifically, the control unit 154 acquires an ID (e.g., device ID) associated with the cryptographic key from the second setting information stored in the storage unit 153. Next, the control unit 154 generates screen information including the acquired ID and causes the operation display unit 151 to display the generated screen information. For example, the control unit 154 generates the screen information illustrated in FIG. 9 and causes the operation display unit 151 to display the generated screen information.

The operator selects an ID (ID of the wireless device 11) relating to the wireless device 11 to be caused to join the wireless network N1 from among the IDs displayed in the display region 23 displayed on the screen illustrated in FIG. 9 or displayed on pull-down menus.

When the write instruction is given in the process of step S213, the control unit 154 of the information terminal apparatus 15 acquires the second setting information corresponding to the ID (e.g., device ID, second cryptographic key, network ID and join key) selected by the operator from the storage unit 153. The control unit 154 controls the NFC reader/writer 152 to transmit a data write request and the data to be written (second setting information acquired from the storage unit 153) to the wireless device 11.

When the data write request is received in the process of step S214, the control unit 115 of the wireless device 11 writes the second setting information which is the data to be written to the storage unit 114.

When a response indicating the completion of writing is obtained from the wireless device 11 in the process of step S216, the control unit 154 of the information terminal apparatus 15 presents to the operator, information that writing of the second setting information to the wireless device 11 is completed.

After that, when registration of the second setting information with the wireless device 11, that is, provisioning is completed, the wireless device 11 executes connection processing with the gateway 12 in the process of step S217. When the connection between the wireless device 11 and the gateway 12 is completed, the wireless device 11 performs cryptographic communication with the management apparatus 13.

According to the setting system 100 configured as described above, the portable medium 14 in which information necessary for entry of the wireless device 11 is registered is saved at the site of the plant in an environment in which communication with the management apparatus 13 is limited to only communication via the wireless network N1 managed by the management apparatus 13. The information terminal apparatus 15 acquires setting information from the portable medium 14 and sets the acquired setting information in the wireless device 11. Therefore, even when communication with the management apparatus 13 is limited to only communication via the wireless network N1 managed by the management apparatus 13, it is possible to cause the wireless device 11 to join the wireless network N1 managed by the management apparatus 13.

Although a configuration has been described in the previously-described embodiments in which the management apparatus 13 generates the NM-cryptographic key registration table 20 and the device-cryptographic key registration table 21, the management apparatus 13 may be configured so as to generate the NM-cryptographic key registration table 20 and the device-cryptographic key registration table 21 in a cloud server. Configured in that way, the management apparatus 13 acquires either the NM-cryptographic key registration table 20 or the device-cryptographic key registration table 21 generated in the cloud server and writes the first setting information or the second setting information obtained based on the acquired NM-cryptographic key registration table 20 or device-cryptographic key registration table 21 to the portable medium 14.

In one or more embodiments, the information terminal apparatus 15 sets setting information in the wireless device 11 based on information obtained from the wireless device 11.

An overall configuration of the setting system according to one or more embodiments is similar to the configuration of the setting system 100 according to the previously-described embodiments illustrated in FIG. 1. Thus, detailed description of the setting system 100 is omitted. Hereinafter, only differences will be described.

Differences in operation of the management apparatus 13 will be described first. When the administrator instructs generation of a cryptographic key and sets setting instruction information that defines which of the first setting information or the second setting information is set, the control unit 134 of the management apparatus 13 performs processing in accordance with the setting instruction information. Hereinafter, operation of the management apparatus 13 will be described more specifically.

When the setting instruction information which has been set includes an instruction to set first setting information, the control unit 134 of the management apparatus 13 generates the NM-cryptographic key registration table 20 using a method similar to that of the previously-described embodiments.

Figure 10:
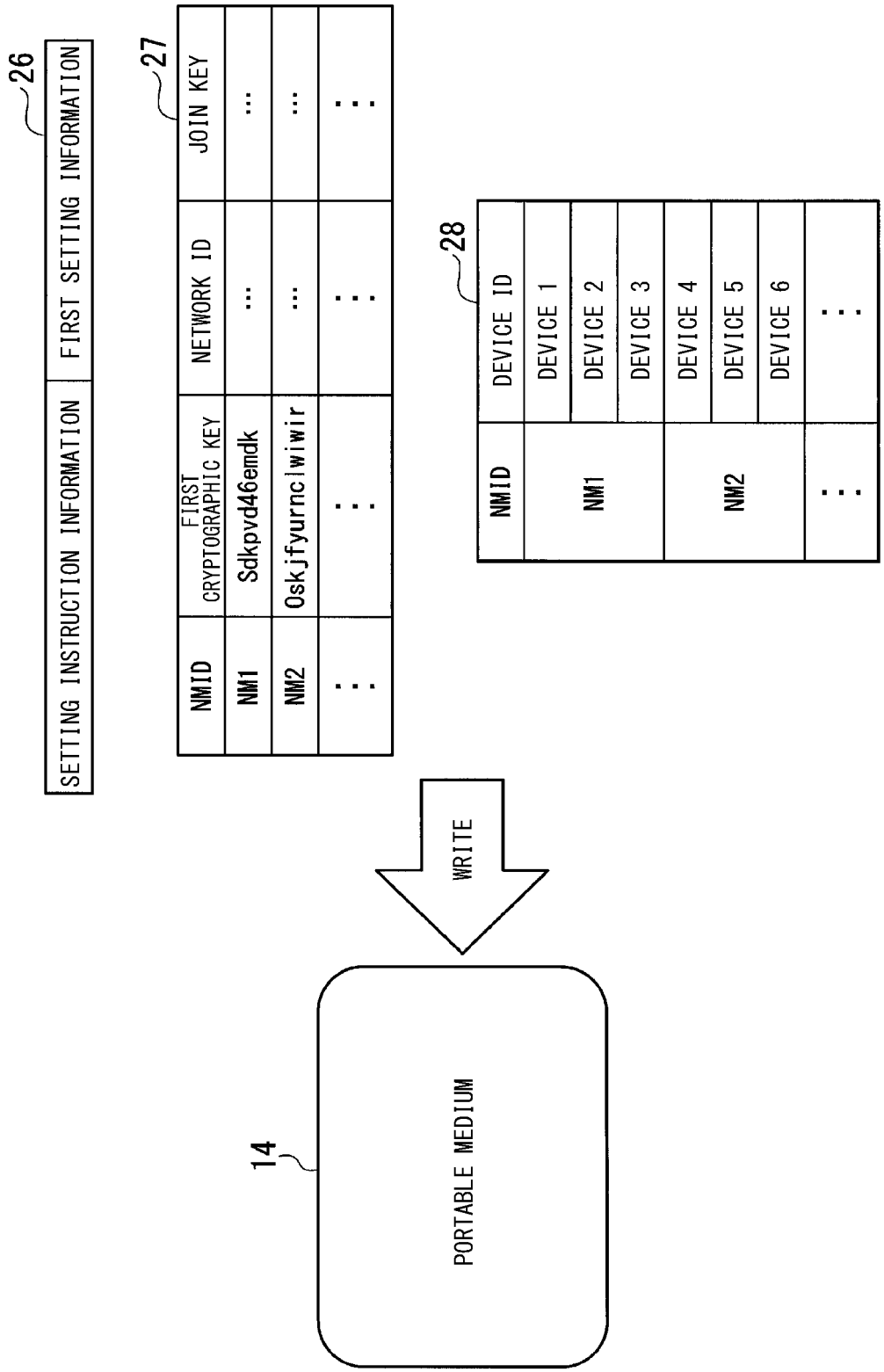
FIG. 10 is a diagram illustrating an example of information recorded in a portable medium according to one or more embodiments.

After that, the control unit 134 generates the first setting information by associating a join key and a network ID with each piece of identification information of the management apparatus 13 in the NM-cryptographic key registration table. The control unit 134 generates a table in which the identification information of the management apparatus 13 and the identification information of the wireless device 11 belonging to the management apparatus 13 are registered in association with each other (hereinafter referred to as a "NM-wireless device registration table") (table designated by reference numeral 28 in FIG. 10) by associating the identification information of the management apparatus 13 with the identification information of the wireless device 11 belonging to the management apparatus 13 for each management apparatus 13. After that, as illustrated in FIG. 10, the NFC reader/writer 132 of the management apparatus 13 writes the setting instruction information 26 (information instructing which of the first setting information or the second setting information should be set), the first setting information 27 and the NM-wireless device registration table 28 to the portable medium 14. FIG. 10 is a diagram illustrating an example of information recorded in the portable medium 14 according to one or more embodiments.

Figure 11:
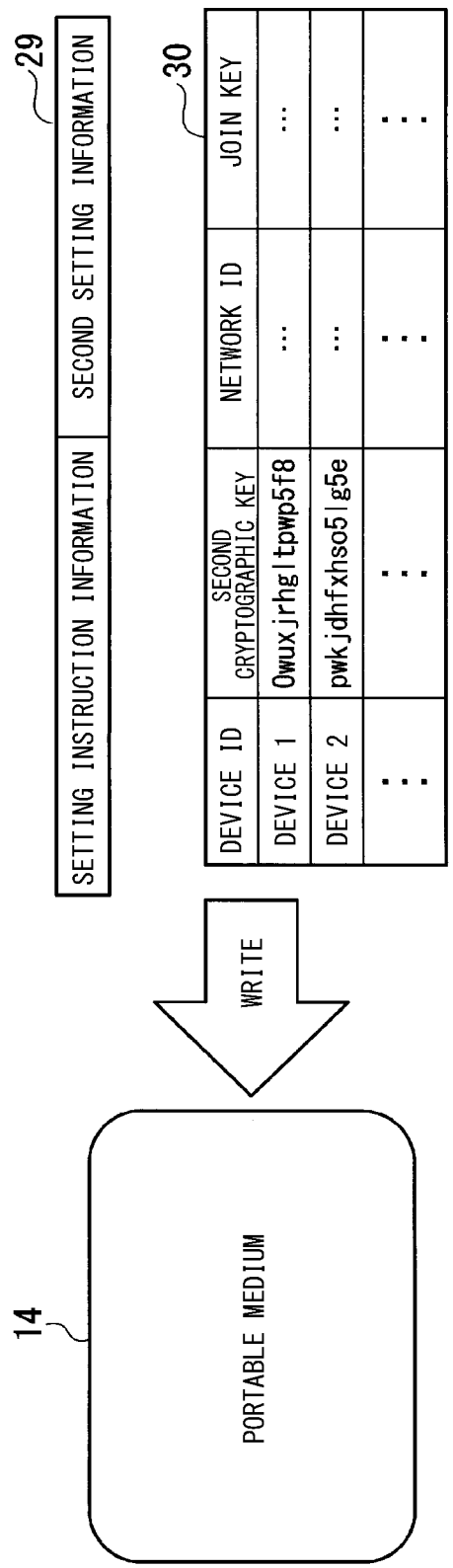
FIG. 11 is a diagram illustrating an example of the information recorded in the portable medium according to one or more embodiments.

When the setting instruction information which has been set includes an instruction to set the second setting information, the control unit 134 of the management apparatus 13 generates the device-cryptographic key registration table 21 using a method similar to that of the previously-described embodiments. After that, the control unit 134 generates the second setting information by associating a join key and a network ID with each piece of identification information of the wireless device 11 in the device-cryptographic key registration table 21. As illustrated in FIG. 11, the NFC reader/writer 132 of the management apparatus 13 writes the setting instruction information 29 and the second setting information 30 to the portable medium 14. FIG. 11 is a diagram illustrating an example of information recorded in the portable medium 14 according to one or more embodiments.

Through the above-described processing, the setting instruction information is recorded in the portable medium 14 together with the first setting information or the second setting information.

Next, differences in operation of the information terminal apparatus 15 will be described. The control unit 154 of the information terminal apparatus 15 sets either the first setting information or the second setting information in the wireless device 11 according to the setting instruction information obtained from the portable medium 14. More specifically, when the setting instruction information obtained from the portable medium 14 includes a first setting information write instruction, the control unit 154 sets the first setting information in the wireless device 11. When the setting instruction information obtained from the portable medium 14 includes a second setting information write instruction, the control unit 154 sets the second setting information in the wireless device 11.

Figure 12:
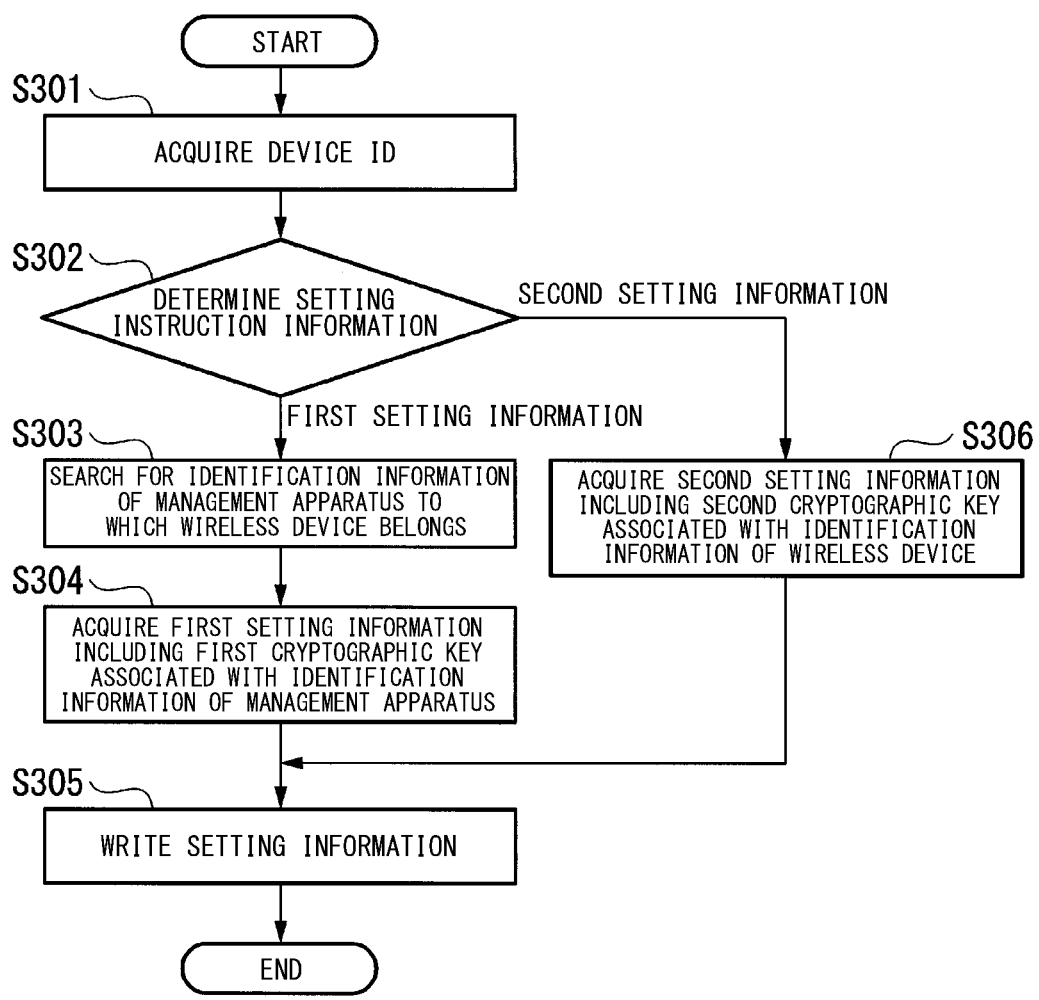
FIG. 12 is a flowchart illustrating a processing flow of an information terminal apparatus according to one or more embodiments.

FIG. 12 is a flowchart illustrating a processing flow of the information terminal apparatus 15 according to one or more embodiments. In the processing in FIG. 12, it is assumed that the information terminal apparatus 15 acquires either the first setting information or the second setting information and the setting instruction information from the portable medium 14.

The NFC reader/writer 152 of the information terminal apparatus 15 acquires identification information of the wireless device 11 via NFC with the wireless device 11 (step S301). Next, with reference to the setting instruction information stored in the storage unit 153, the control unit 154 determines whether the instruction included in the setting instruction information is an instruction for setting the first setting information or an instruction for setting the second setting information (step S302).

When the instruction included in the setting instruction information is the first setting information (step S302—first setting information), the control unit 154 searches for the identification information of the management apparatus 13 to which the wireless device 11 identified by the device ID acquired in the process of step S301 belongs with reference to the NM-device registration table 28 (step S303). Next, the control unit 154 acquires the first setting information corresponding to the identification information of the management apparatus 13 obtained as a search result from the first setting information 27 (step S304). The control unit 154 controls the NFC reader/writer 152 to write the acquired first setting information to the wireless device 11 (step S305).

In the process of step S302, when the instruction included in the setting instruction information is the second setting information (step S302—second setting information), the control unit 154 acquires the second setting information corresponding to the device ID obtained in the process of step S301 from the second setting information 30 (step S306). After that, the control unit 154 controls the NFC reader/writer 152 to write the acquired second setting information to the wireless device 11 (step S305).

According to the setting system 100 according to one or more embodiments configured as described above, it is possible to reduce manual operation and thereby reduce human setting errors. Furthermore, since manual operation can be reduced, it is possible to reduce the operator's burden as well.

In one or more embodiments, the information terminal apparatus 15 generates setting information.

Figure 13:
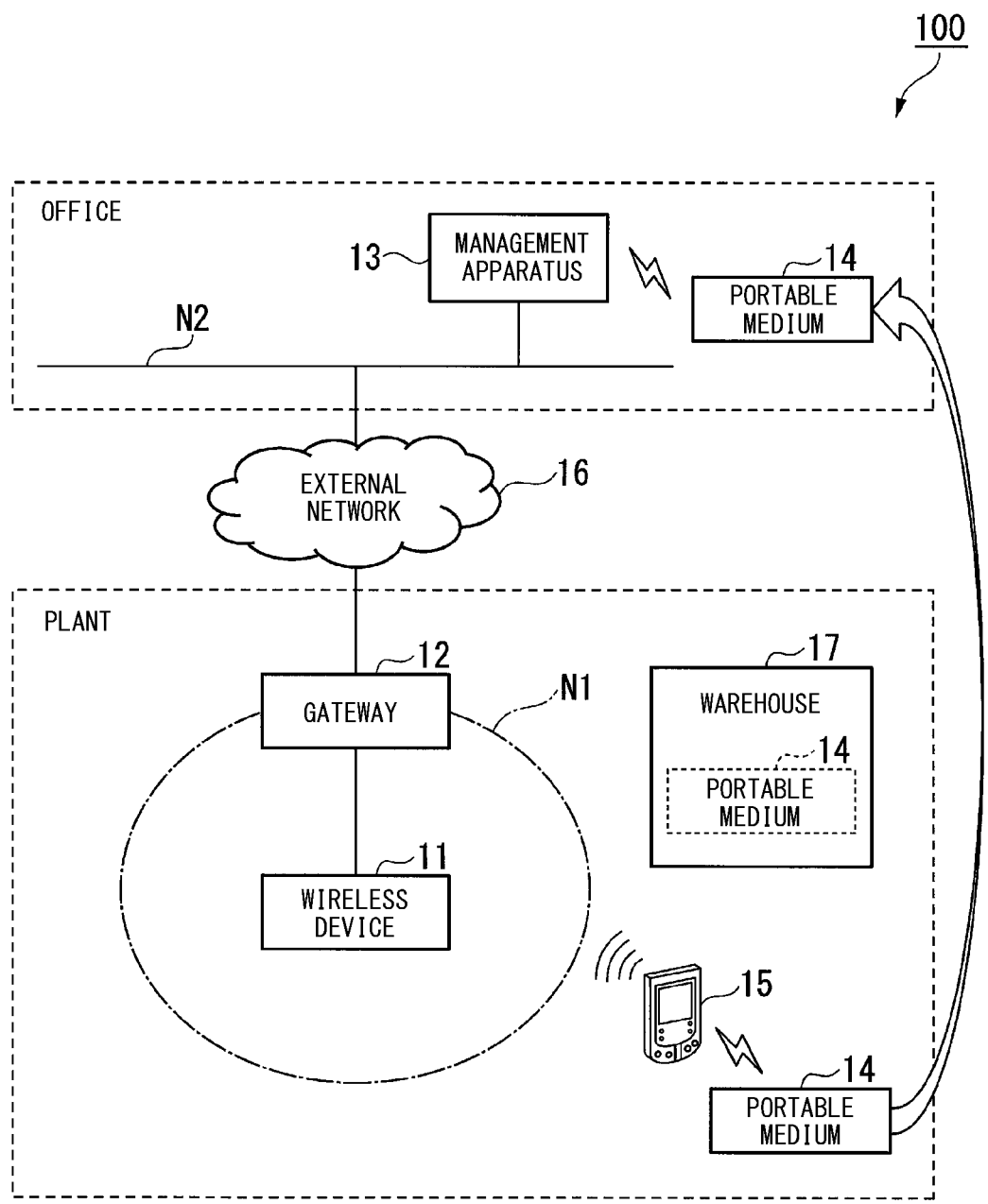
FIG. 13 is a block diagram illustrating an overall configuration of a setting system according to one or more embodiments.

FIG. 13 is a block diagram illustrating an overall configuration of the setting system 100 according to one or more embodiments. An overall configuration of the setting system 100 of one or more embodiments is similar to that of the setting system 100 according to the previously-described embodiments illustrated in FIG. 1. Thus, detailed description of the setting system 100 is omitted. Hereinafter, only differences will be described.

In one or more embodiments, setting information is written in the portable medium 14 in the plant and the portable medium 14 having recorded therein the setting information is carried into the office where the management apparatus 13 is set.

Figure 14:
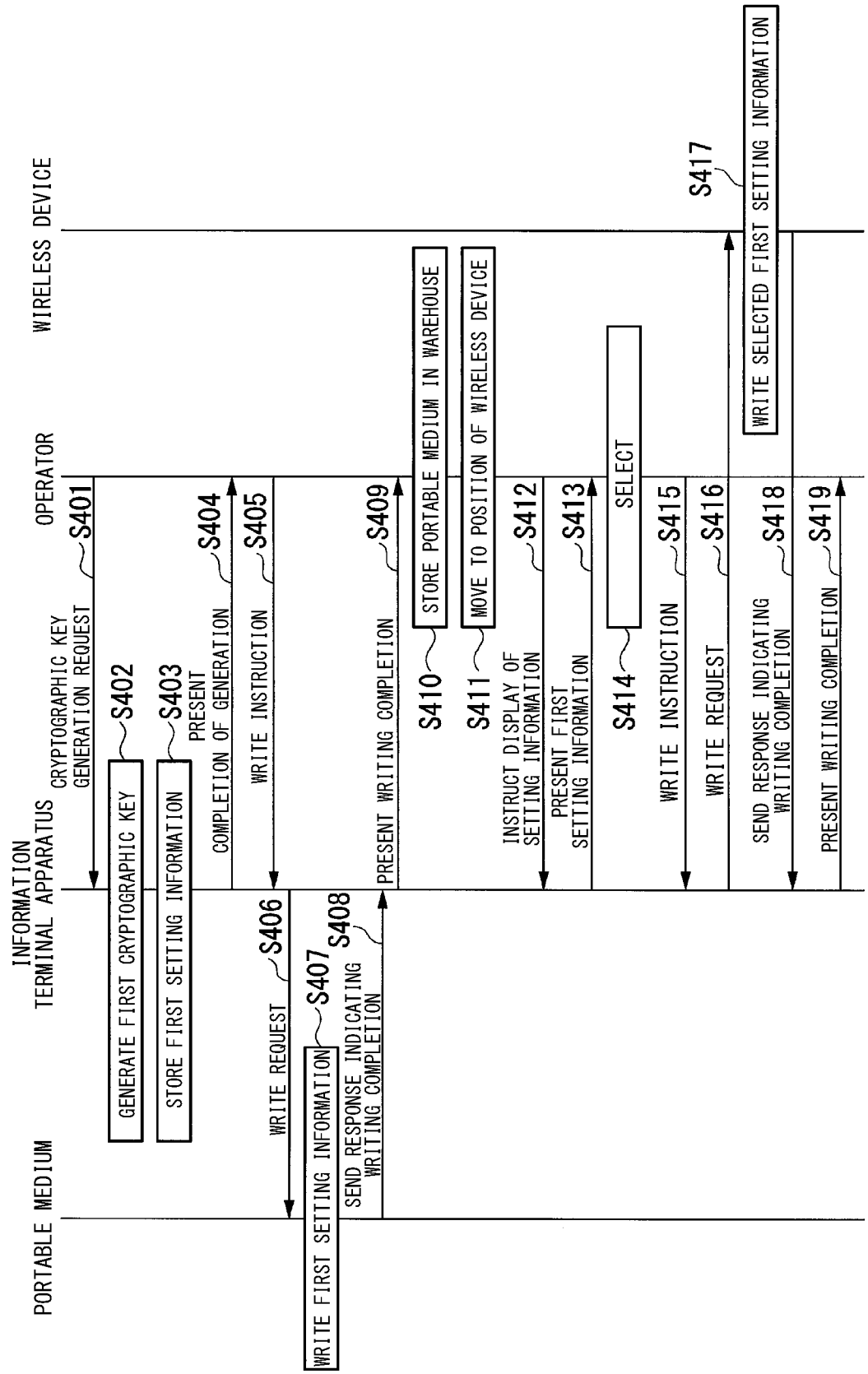
FIG. 14 is a sequence diagram illustrating a processing flow of writing setting information to a wireless device of the setting system according to one or more embodiments.

FIG. 14 is a sequence diagram illustrating a processing flow of writing setting information to the wireless device 11 of the setting system 100 according to one or more embodiments. A case will be described in FIG. 14 as an example where the first setting information is written to the wireless device 11.

The operator operates the operation display unit 151 of the information terminal apparatus 15 to request generation of a cryptographic key first (step S401). Suppose the operator instructs generation of the first cryptographic key. The control unit 154 of the information terminal apparatus 15 generates the first cryptographic key using the identification information of the management apparatus 13 and random numbers according to the cryptographic key generation request (step S402). For example, the control unit 154 generates a plurality of first cryptographic keys using the identification information stored in the own apparatus or the inputted identification information of the management apparatus 13 respectively.

The control unit 154 generates the NM-cryptographic key registration table 20 by associating the generated first cryptographic key with the identification information of the management apparatus 13. Furthermore, the control unit 154 generates a join key for each piece of identification information of the management apparatus 13 and causes the storage unit 153 to store the first setting information in which the generated join key, the network ID, the first cryptographic key and the identification information of the management apparatus 13 are associated with each other (step S403). The control unit 154 presents to the operator, information that the generation of the cryptographic key is completed (step S404). For example, the control unit 154 controls the operation display unit 151 to display the information that the generation of the cryptographic key is completed.

Next, the operator brings the portable medium 14 closer to the information terminal apparatus 15 and instructs the information terminal apparatus 15 to write setting information. For example, the operator operates the information terminal apparatus 15 to instruct writing of the setting information via NFC (step S405). When the setting information write instruction is given, the control unit 154 reads the first setting information stored in the storage unit 153. Next, the control unit 154 controls the NFC reader/writer 152 to supply power to the portable medium 14 and transmit the data write request and the data to be written (read first setting information) to the portable medium 14 (step S406).

When the data write request is received, the control unit 145 of the portable medium 14 writes the first setting information which is the data to be written to the storage unit 146 (step S407). When the data write is completed, the control unit 145 controls the transmission/reception processing unit 144 to send a response notifying the information terminal apparatus 15 of the completion of writing (step S408).

When the response notifying the completion of writing is obtained from the portable medium 14, the control unit 154 of the information terminal apparatus 15 presents to the operator, information that the writing to the portable medium 14 is completed (step S409). For example, the control unit 154 controls the operation display unit 151 to display information that the writing to the portable medium 14 is completed.

After that, the operator stores the portable medium 14 in the warehouse 17 (step S410). The operator carries the information terminal apparatus 15 and moves to the position of the wireless device 11 to be caused to join the wireless network N1 (step S411). The operator operates the information terminal apparatus 15 he/she carries to instruct display of the setting information (step S412). The control unit 154 of the information terminal apparatus 15 controls the operation display unit 151 to present the setting information in accordance with the instruction of display of the setting information (step S413). The specific process is similar to the process of step S210.

The operator selects the ID relating to the wireless device 11 to be caused to join the wireless network N1 from among IDs displayed in the display region 23 displayed on the screen illustrated in FIG. 9 or displayed on pull-down menus (step S414). The operator then selects the ID of the management apparatus 13 that manages the specified wireless network N1. After that, the operator operates the information terminal apparatus 15 to select the execution button 25 and thereby instruct writing (step S415). At this time, the operator brings the wireless device 11 and the information terminal apparatus 15 closer to positions at which they can communicate with each other via NFC.

When a write instruction is given, the control unit 154 of the information terminal apparatus 15 acquires the first setting information corresponding to the ID selected by the operator (e.g., NMID, first cryptographic key, network ID and join key) from the storage unit 153. The control unit 154 controls the NFC reader/writer 152 to wirelessly transmit a data write request and data to be written (first setting information acquired from the storage unit 153) to the device 11 (step S416).

When the data write request is received, the control unit 115 of the wireless device 11 writes the first setting information which is the data to be written to the storage unit 114 (step S417). When the data writing is completed, the control unit 115 controls the NFC tag 113 to send a response notifying the information terminal apparatus 15 of the completion of writing (step S418).

When the response notifying the completion of writing is obtained from the wireless device 11, the control unit 154 of the information terminal apparatus 15 presents to the operator, information that the writing of the first setting information to the wireless device 11 is completed (step S419). For example, the control unit 154 controls the operation display unit 151 to display the information that the writing of the first setting information to the wireless device 11 is completed.

Figure 15:
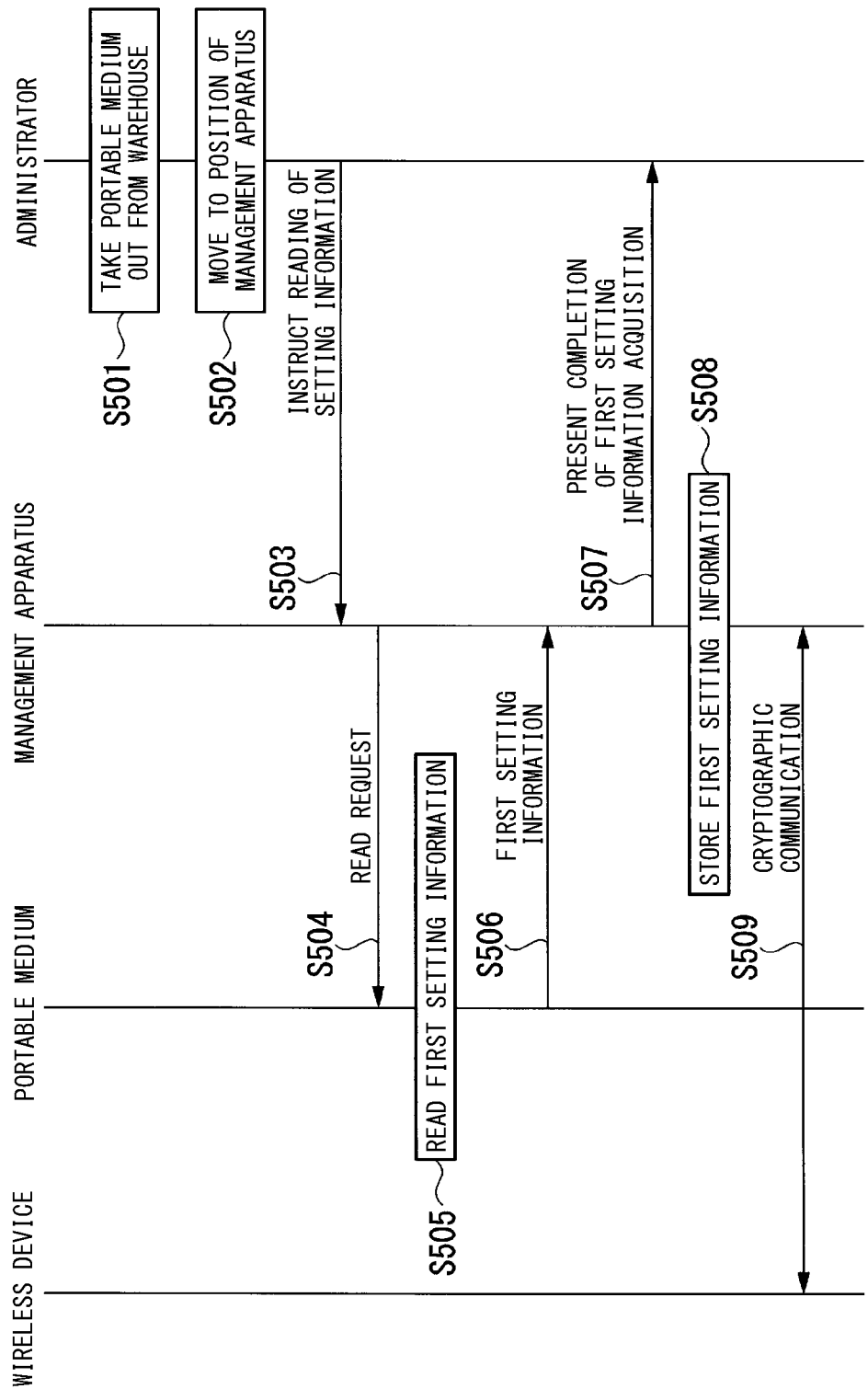
FIG. 15 is a sequence diagram illustrating a processing flow of registering setting information with a management apparatus of the setting system according to one or more embodiments.

FIG. 15 is a sequence diagram illustrating a processing flow of registration of the setting information with the management apparatus 13 of the setting system 100 according to one or more embodiments. Although a case will be described in FIG. 15 as an example where it is the administrator who takes out the portable medium 14 and carries the portable medium 14 to the position of the management apparatus 13, a person who takes out the portable medium 14 and carries the portable medium 14 to the position of the management apparatus 13 may be the operator. Note that it is assumed that the portable medium 14 having recorded therein the first setting information.

The administrator takes the portable medium 14 out from the warehouse 17 (step S501). The administrator carries the portable medium 14 that has been taken out and moves the portable medium 14 to the position of the management apparatus 13 (step S502).

The administrator operates the management apparatus 13 to instruct reading of the setting information (step S503). At this time, the administrator brings the management apparatus 13 and the portable medium 14 closer to positions at which they can communicate with each other via NFC. When an instruction for reading the setting information is given, the control unit 134 of the management apparatus 13 controls the NFC reader/writer 132 to supply power to the portable medium 14 and transmit a data read request to the portable medium 14 (step S504).

When the data read request is received, the control unit 145 of the portable medium 14 reads the first setting information stored in the storage unit 146 (step S505). The control unit 145 controls the transmission/reception processing unit 144 to transmit the read first setting information to the management apparatus 13 (step S506).

The NFC reader/writer 132 of the management apparatus 13 receives the first setting information transmitted from the portable medium 14. When the first setting information is received, the control unit 134 presents information that the acquisition of the first setting information is completed (step S507). For example, the control unit 134 controls the operation display unit 131 to display the information that the acquisition of the first setting information is completed. The control unit 134 causes the storage unit 133 to store the first setting information received via the NFC reader/writer 132 (step S508).

Through the above-described processing, registration of the setting information with the management apparatus 13 is completed. After that, cryptographic communication is executed between the wireless device 11 and the management apparatus 13 (step S509).

According to the setting system 100 of one or more embodiments configured as described above, when the environment in the plant is such an environment in which communication with the management apparatus 13 is limited to only communication via the wireless network N1 managed by the management apparatus 13, the information terminal apparatus 15 generates information necessary for entry of the wireless device 11 and the portable medium 14 having recorded therein the generated information is saved in the site in the plant. The information recorded in the portable medium 14 is setting information to be set in the management apparatus 13. Therefore, it is possible to cause the wireless device 11 to join the wireless network N1 managed by the management apparatus 13 even when communication with the management apparatus 13 is limited to only communication via the wireless network N1 managed by the management apparatus 13.

As with the information terminal apparatus 15 according to the previously-described embodiments may be configured to automatically set setting information in the wireless device 11 based on the information obtained from the wireless device 11. When configured in this way, the control unit 154 of the information terminal apparatus 15 also generates setting instruction information when generating a cryptographic key.

In the previously-described embodiments, a configuration when the portable medium 14 in which the information terminal apparatus 15 records the setting information is a non-contact IC card has been described. When the portable medium 14 is any one of a USB memory, a portable information processing apparatus, a magnetic card and a medium in which code information is printed, the management apparatus 13 and the information terminal apparatus 15 operate as follows.

When the portable medium 14 is a USB memory, the information terminal apparatus 15 is further provided with a writing unit that writes setting information to the USB memory connected to a USB port. When the portable medium 14 is a USB memory, the management apparatus 13 is further provided with a reading unit that reads setting information from the USB memory connected to the USB port. The reading unit acquires the setting information by reading the setting information from the USB memory.

When the portable medium 14 is a portable information processing apparatus, the information terminal apparatus 15 communicates with the information processing apparatus via the NFC reader/writer 152 or a communication unit (not illustrated) to thereby write the setting information to the information processing apparatus. When the portable medium 14 is a portable information processing apparatus, the management apparatus 13 communicates with the information processing apparatus via the NFC reader/writer 132 or the communication unit 135 to thereby read the setting information from the information processing apparatus. The NFC reader/writer 132 or the communication unit 135 reads the setting information from the information processing apparatus to thereby acquire the setting information.

When the portable medium 14 is a magnetic card, the information terminal apparatus 15 is further provided with a magnetic reader/writer that generates a magnetic pattern indicating setting information and writes the generated magnetic pattern to the portable medium 14. When the portable medium 14 is a magnetic card, the management apparatus 13 is further provided with a magnetic reader/writer that reads a magnetic pattern from the portable medium 14. The magnetic reader/writer acquires the setting information by reading the magnetic pattern from the portable medium 14.

When the portable medium 14 is a medium in which code information is printed, the information terminal apparatus 15 is further provided with a printing unit that generates code information indicating setting information and prints the generated code information to the medium. When the portable medium 14 is a medium in which code information is printed, the management apparatus 13 is further provided with a code reading unit that reads code information from the portable medium 14 in which the code information is printed. The code reading unit acquires the setting information by optically reading the code information from the portable medium 14.

Hereinafter, modifications common to a plurality of embodiments will be described.

In the previously-described embodiments, a configuration in the case where the portable medium 14 in which the management apparatus 13 records setting information is a non-contact IC card has been described. When the portable medium 14 is any one of a USB memory, a portable information processing apparatus, a magnetic card and a medium in which code information is printed, the management apparatus 13 and the information terminal apparatus 15 operate as follows.

When the portable medium 14 is a USB memory, the management apparatus 13 is provided with a writing unit that writes setting information to the USB memory connected to the USB port instead of the NFC reader/writer 132. When the portable medium 14 is a USB memory, the information terminal apparatus 15 is further provided with a reading unit (acquisition unit) that reads setting information from the USB memory connected to the USB port. The reading unit acquires the setting information by reading the setting information from the USB memory.

When the portable medium 14 is a portable information processing apparatus, the management apparatus 13 communicates with the information processing apparatus via the NFC reader/writer 132 or the communication unit 135 to thereby write setting information to the information processing apparatus. When the portable medium 14 is a portable information processing apparatus, the information terminal apparatus 15 communicates with the information processing apparatus via the NFC reader/writer 152 or a communication unit (not illustrated) (acquisition unit) to thereby read the setting information from the information processing apparatus. The NFC reader/writer 152 or the communication unit acquires setting information by reading the setting information from the information processing apparatus.

When the portable medium 14 is a magnetic card, the management apparatus 13 is provided with a magnetic reader/writer that generates a magnetic pattern indicating setting information and writes the generated magnetic pattern to the portable medium 14 instead of the NFC reader/writer 132. When the portable medium 14 is a magnetic card, the information terminal apparatus 15 is further provided with a magnetic reader/writer (acquisition unit) that reads a magnetic pattern from the portable medium 14. The magnetic reader/writer acquires the setting information by reading the magnetic pattern from the portable medium 14.

When the portable medium 14 is a medium in which code information is printed, the management apparatus 13 is provided with a printing unit that generates code information indicating setting information and prints the generated code information in the medium instead of the NFC reader/writer 132. When the portable medium 14 is a medium in which code information is printed, the information terminal apparatus 15 is further provided with a code reading unit (acquisition unit) that reads code information from the portable medium 14 in which code information is printed. The code reading unit acquires setting information by optically reading the code information from the portable medium 14.

Figure 16:
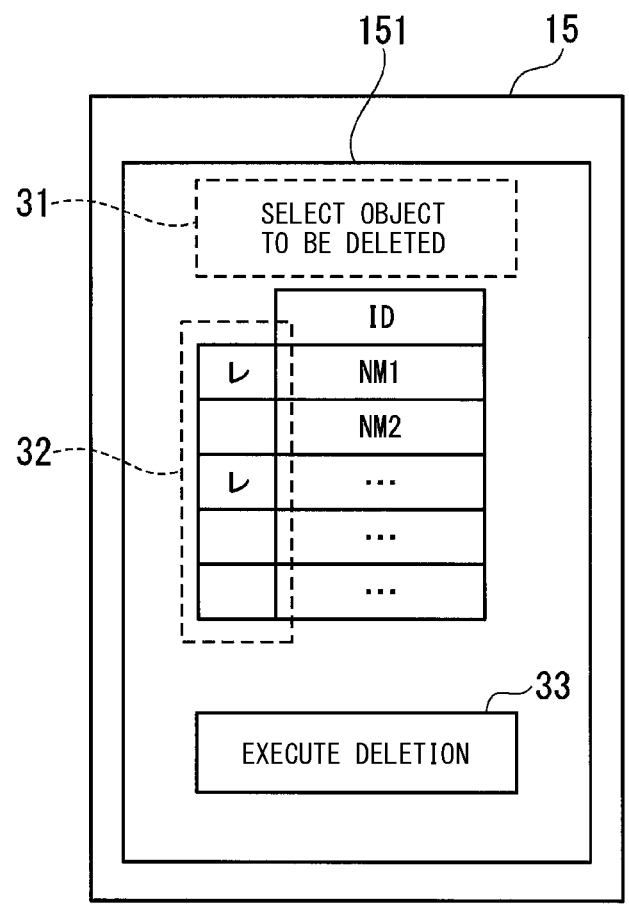
FIG. 16 is a diagram for describing a configuration for deleting setting information.

In each embodiment described above, the information terminal apparatus 15 may be configured to delete the setting information stored in the storage unit 153 according to the user's (e.g., the administrator's or the operator's) operation. This configuration will be described using FIG. 16. FIG. 16 is a diagram for describing the configuration in which the setting information is deleted.

The display screen illustrated in FIG. 16 is displayed on the operation display unit 151 by the user operating the information terminal apparatus 15 to input an instruction for deleting the setting information to the information terminal apparatus 15. The screen illustrated in FIG. 16 displays an instruction 31 to the user, a selection region 32 to select an object to be deleted and an execution button 33 to execute deletion. The selection region 32 displays an ID relating to the setting information associated therewith. The ID displayed in association therewith in the selection region 32 is, for example, NMID or device ID.

The user selects an object to be deleted by selecting a check box in the selection region 32. The control unit 154 causes a check mark to be displayed in the check box selected by the user. After that, when the execution button 33 is selected by the user, the control unit 154 deletes the setting information associated with the selected ID from the storage unit 153. More specifically, the control unit 154 deletes the setting information corresponding to the ID selected from the first setting information or second setting information stored in the storage unit 153.

The above-described configuration can prevent setting information from being leaked from the information terminal apparatus 15.

Figure 17:
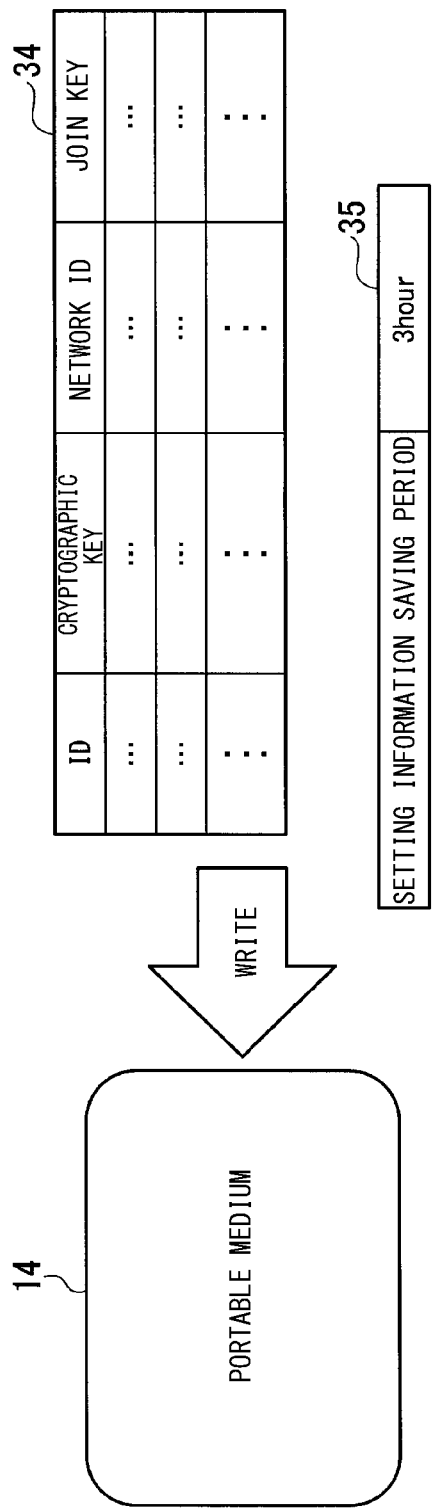
FIG. 17 is a diagram for describing a configuration in which time information indicating a time to delete setting information is recorded in the portable medium.

In the previously-described embodiments, time information indicating a time to delete setting information may further be recorded in the portable medium 14. This configuration will be described using FIG. 17. FIG. 17 is a diagram for describing a configuration in which time information indicating the time to delete setting information is recorded in the portable medium 14.

First, operation of the management apparatus 13 will be described. In the previously-described embodiments, when the administrator instructs generation of a cryptographic key and inputs a setting information saving period as time information indicating the time to delete the setting information, the control unit 134 of the management apparatus 13 generates setting information 34 (e.g., first setting information or second setting information) based on the instruction for generating a cryptographic key. The control unit 134 writes the setting information 34 and the time information 35 to the portable medium 14 as illustrated in FIG. 17. Thus, the time information 35 indicating the time to delete the setting information in addition to the setting information 34 is recorded in the portable medium 14 according to at least one of the previously-described embodiments. Furthermore, the time information 35 indicating the time to delete the setting information in addition to the setting information 34 and the setting instruction information is recorded in the portable medium 14 according to at least another one of the previously-described embodiments.

Next, operation of the information terminal apparatus 15 will be described. Upon acquiring at least the setting information and the time information from the portable medium 14, the control unit 154 of the information terminal apparatus 15 sets the time indicated by the time information. Next, the control unit 154 starts measuring the time after acquiring the setting information from the portable medium 14 and deletes the setting information after the set time elapses. In the example in FIG. 17, the control unit 154 starts measuring the time after acquiring the setting information from the portable medium 14 and deletes all the setting information after three hours elapse. Note that although a configuration has been described above where the control unit 154 starts measuring the time after acquiring the setting information from the portable medium 14, the timing to start time measurement need not be limited to this. For example, the control unit 154 may be configured to start measuring the time when a predetermined time elapses after acquiring the setting information from the portable medium 14 or using the time at which time setting is completed as a reference.

The control unit 154 of the information terminal apparatus 15 may also be configured to display on the operation display unit 151, advance information indicating approximately how much time needs to elapse as a predetermined time period before deleting the setting information. The control unit 154 may also be configured to display the advance information on the operation display unit 151 and output an alarm sound (e.g., beep sound) to urge the user to check the advance information.

In the above-described configuration, it is possible to urge the user to set the setting information in the wireless device 11 before the setting information is deleted. The user can set the setting information in the wireless device 11 before the setting information is deleted and complete the setting.

Figure 18:
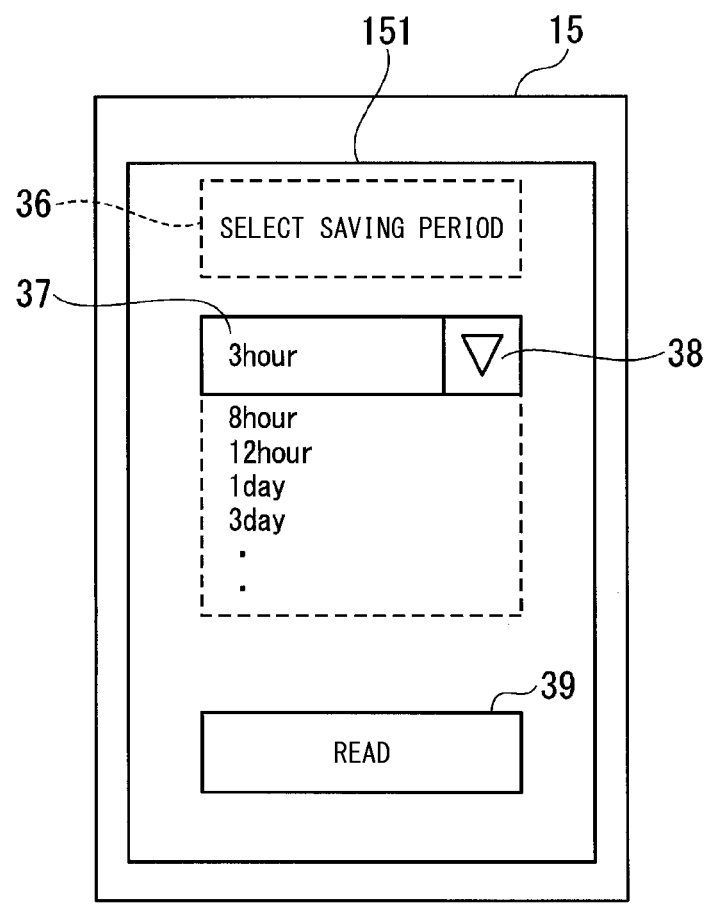
FIG. 18 is a diagram illustrating an example of a setting screen to set a period during which setting information is saved in the information terminal apparatus.

In the previously-described embodiments, the information terminal apparatus 15 may be configured to set the time to delete the setting information stored in the own apparatus in accordance with the operation of the user (e.g., administrator or operator) and delete the setting information after the set time elapses. This configuration will be described using FIG. 18. FIG. 18 is a diagram illustrating an example of a setting screen to set a saving period of the setting information in the information terminal apparatus 15.

The setting screen illustrated in FIG. 18 is displayed on the operation display unit 151 by the user operating the information terminal apparatus 15 to input an instruction for setting the saving period to the information terminal apparatus 15. The setting screen illustrated in FIG. 18 displays an instruction 36 to the user, a display region 37 to display information of the saving period of the setting information, a display button 38 to display information of other saving periods not displayed in the display region 37 and an execution button 39 to execute reading of the setting information from the portable medium 14.

When the user selects the display button 38, the control unit 154 displays the information of the other saving periods not displayed in the display region 37 on pull-down menus. The user operates the operation display unit 151 to select the saving period. When the user selects a saving period and selects the execution button 39, the information terminal apparatus 15 starts reading the setting information from the portable medium 14. When the setting information is read, the control unit 154 of the information terminal apparatus 15 associates the read setting information with the information of the saving period selected by the user and stores the setting information in the storage unit 153. The control unit 154 starts measuring the time after the reading of the setting information is completed and deletes the setting information when the saving period elapses.

Note that although a configuration has been described above where after the user selects the saving period, the information terminal apparatus 15 starts reading the setting information from the portable medium 14 and starts measuring the time after the reading of the setting information is completed, the timing to start measuring the time need not be limited to this. For example, the information terminal apparatus 15 starts reading the setting information from the portable medium 14, displays the setting screen on the operation display unit 151 when a predetermined time elapses after the reading of the setting information is completed or at timing at which the user instructs setting of the saving period after the reading of the setting information is completed and causes the user to select the saving period. Next, when the user selects the saving period and the execution button 39 is selected, the information terminal apparatus 15 sets the selected saving period. The information terminal apparatus 15 starts measuring the time using the time at which the saving period is set as a reference. After that, the information terminal apparatus 15 deletes the setting information when the saving period elapses.

The information terminal apparatus 15 according to the previously-described embodiments may be configured to read the setting information from a plurality of portable media 14 and store a plurality of pieces of setting information. This configuration will be described using FIG. 19.

Figure 19:
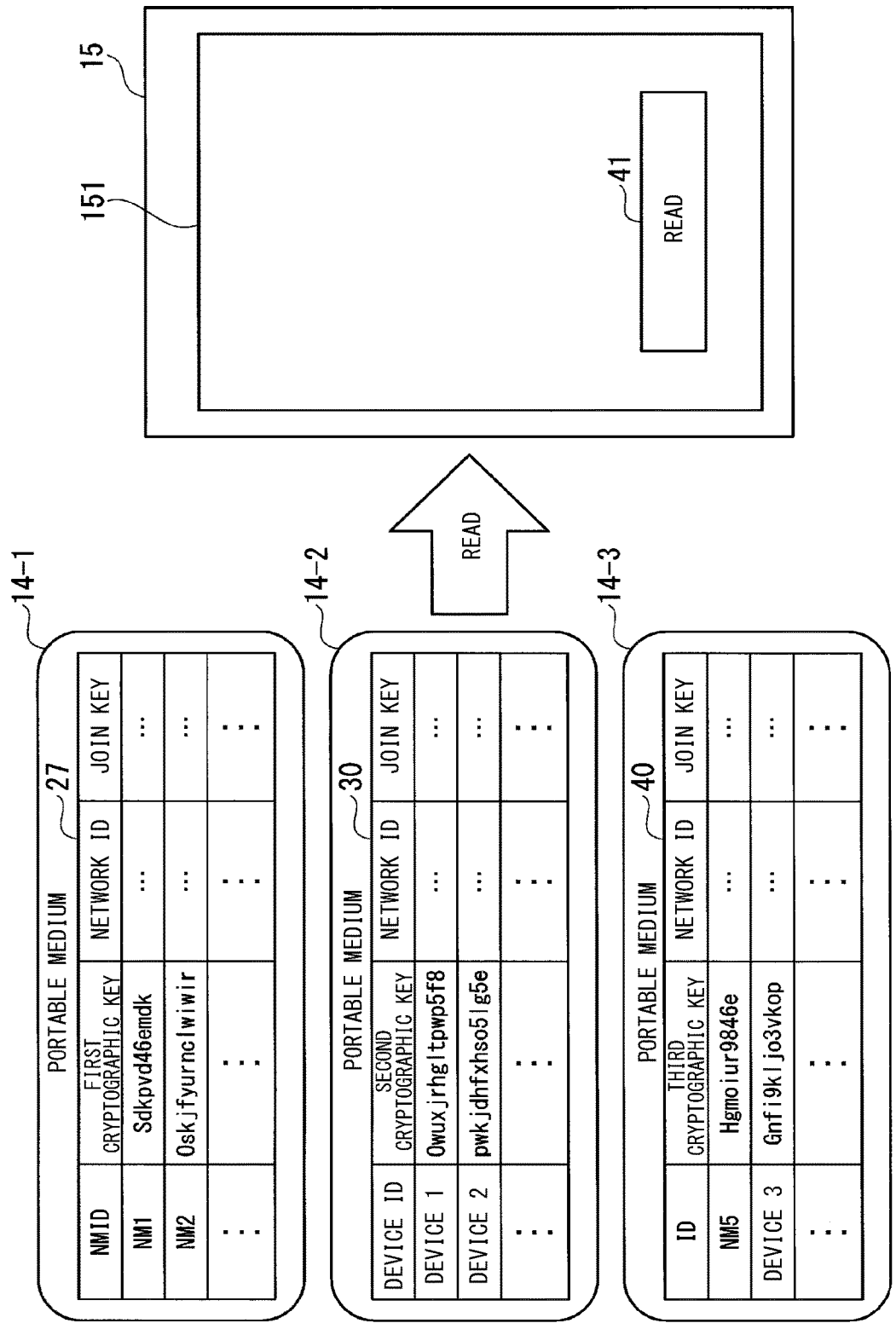
FIG. 19 is a diagram for describing a configuration of reading setting information recorded in a plurality of portable media.

FIG. 19 is a diagram for describing a configuration in which the setting information recorded in the plurality of portable media 14 is read.

First, operation of the management apparatus 13 will be described. When the administrator instructs writing of the setting information to the plurality of portable media 14-1, 14-2 and 14-3, the control unit 134 of the management apparatus 13 according to the previously-described embodiments controls the NFC reader/writer 132 to write the setting information to the portable media 14-1, 14-2 and 14-3.

In FIG. 19, suppose first setting information 27 is recorded in the portable medium 14-1, second setting information 30 is recorded in the portable medium 14-2 and third setting information 40 is recorded in the portable medium 14-3. Here, the third setting information 40 includes a mixture of identification information "NM5" of the management apparatus 13 and identification information "device 3" of the wireless device 11 as IDs.

Next, operation of the information terminal apparatus 15 will be described. When a reading button 41 illustrated in FIG. 19 that instructs to start reading is selected, the control unit 154 of the information terminal apparatus 15 controls the NFC reader/writer 152 to acquire setting information from the portable media 14-1, 14-2 and 14-3 respectively. The control unit 154 causes the storage unit 153 to store the plurality of acquired pieces of setting information. After that, the control unit 154 of the information terminal apparatus 15 controls the NFC reader/writer 152 according to the user's operation to write the setting information to the wireless device 11. At this time, the information terminal apparatus 15 controls the operation display unit 151 to present the setting information in accordance with the instruction of display of the setting information as illustrated in step S210 in FIG. 8 and accepts the selection of the setting information to be written. The control unit 154 of the information terminal apparatus 15 controls the NFC reader/writer 152 to write the selected setting information to the wireless device 11.

Configured as described above, the information terminal apparatus 15 can collectively store a plurality of pieces of setting information. This makes it possible to reduce the number of times the portable medium 14 is taken outside. Takeout management of the portable medium 14 can thereby be simplified.

The management apparatus 13 according to the previously-described embodiments may also be configured to read the setting information from the plurality of portable media 14 and store a plurality of pieces of setting information. In such a configuration, the control unit 154 of the information terminal apparatus 15 controls the NFC reader/writer 152 in the same way as the above-described control unit 134 of the management apparatus 13 to write setting information to the portable media 14-1, 14-2 and 14-3 respectively. Furthermore, the control unit 154 controls the NFC reader/writer 152 to write the selected setting information to the wireless device 11.

The control unit 134 of the management apparatus 13 controls the NFC reader/writer 132 in the same way as the above-described control unit 154 of the information terminal apparatus 15 to acquire the setting information from the portable media 14-1, 14-2 and 14-3 respectively. After that, the control unit 134 causes the storage unit 133 to store the plurality of acquired pieces of setting information.

Figure 20:
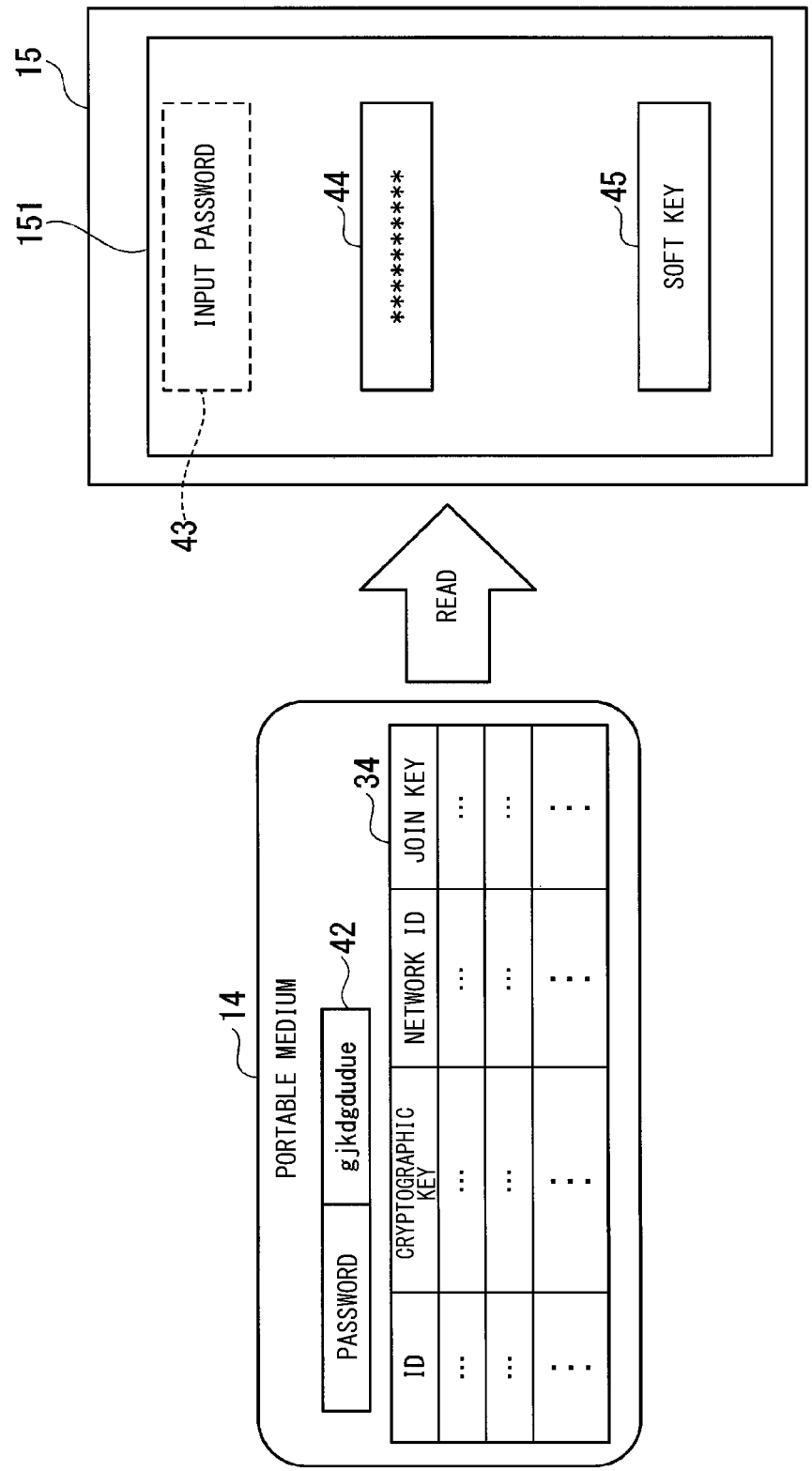
FIG. 20 is a diagram for describing a configuration of setting a password for each portable medium.

In the previously-described embodiments, a password may be set for each portable medium 14. In such a configuration, the password is encrypted so as not to be read by other readers/writers. This configuration will be described using FIG. 20. FIG. 20 is a diagram for describing a configuration in which a password is set for each portable medium 14.

First, operation of the management apparatus 13 will be described. In the previously-described embodiments, when the administrator instructs generation of a cryptographic key and inputs a password, the control unit 134 of the management apparatus 13 generates the setting information 34 based on the instruction to generate a cryptographic key. The control unit 134 encrypts the inputted password based on a predetermined encryption scheme. The control unit 134 writes the setting information 34 and the encrypted password information 42 to the portable medium 14 as illustrated in FIG. 20. Thus, the password information 42 in addition to the setting information 34 is recorded in the portable medium 14 of the previously-described embodiments. The password information 42 in addition to the setting information 34 and the setting instruction information is recorded in the portable medium 14 of the previously-described embodiments.

Next, operation of the information terminal apparatus 15 will be described. The control unit 154 of the information terminal apparatus 15 according to previously-described embodiments acquires the setting information 34 and the encrypted password information 42 from the portable medium 14. The control unit 154 decodes the acquired encrypted password information 42. Note that the decoding method is set in advance in the control unit 154. The control unit 154 controls the operation display unit 151 to display a password input screen as illustrated in FIG. 20.

The password input screen displays an instruction 43 to the user, a password input region 44 and a display button 45 to display a soft key. When a password is inputted to the input region 44, the control unit 154 determines whether or not the password inputted to the input region 44 matches the password obtained by decoding. When the passwords match, the control unit 154 determines that the user is a legitimate user and causes the storage unit 153 to store the read setting information 34. On the other hand, when the passwords do not match, the control unit 154 determines the user to be an illegitimate user and deletes the read setting information 34.

Adopting such a configuration can enhance security. More specifically, reporting the password that the user inputs using a different method (e.g., telephone or mail) in advance makes it possible to reduce the possibility of the password being leaked. Furthermore, as passwords are encrypted, the passwords will never match even if they are read using another reader/writer without a decoding function, and so setting information will never be illegally acquired. It is thereby possible to enhance security.

In the previously-described embodiments, the control unit 154 of the information terminal apparatus 15 encrypts the password information 42 in the same way as the above-described control unit 134 of the management apparatus 13 and writes the setting information 34 and the encrypted password information 42 to the portable medium 14 as illustrated in FIG. 20. The control unit 134 of the management apparatus 13 decodes the encrypted password information 42 and performs determination processing using passwords in the same way as the above-described control unit 154 of the information terminal apparatus 15.

The portable medium 14 in which setting information is written once may be configured so as to prevent rewriting. For example, the portable medium 14 may be provided with a write protect function. Adopting such a configuration can prevent tampering of the setting information.

In each embodiment described above, the wireless network N1 may be provided with a relay apparatus such as a wireless router or backbone router between the wireless device 11 and the gateway 12. The wireless router or backbone router relays data transmitted/received between the wireless device 11 and the gateway 12. The wireless router or backbone router carries out wireless communication compliant with the wireless communication standard ISA100.11a.

In the aforementioned embodiments, the communication protocol used for wireless communication via the wireless network N1 is a communication protocol compliant with the wireless communication standard ISA100.11a. However, the communication protocol used for wireless communication via, for example, the wireless network N1 may be a communication protocol compliant with Wireless HART® (Wireless HART is a registered trademark in Japan, other countries, or both) or ZigBee® (ZigBee is a registered trademark in Japan, other countries, or both).

In each embodiment described above, the portable medium 14 may further has recorded therein setting information for measurement necessary to measure physical quantities of objects to be measured such as measurement of physical quantity, measurement cycle and sensor type. An update cycle which is a cycle in which data transmission/reception is performed may also be recorded in the portable medium 14. In such a configuration, the control unit 154 of the information terminal apparatus 15 acquires measurement setting information in addition to the setting information (first setting information or second setting information) from the portable medium 14 and sets the acquired measurement setting information in the wireless device 11. In such a configuration, it is possible to set measurement setting information in accordance with the physical quantities of the objects to be measured and measure the physical quantities. Furthermore, it is possible to easily perform the same setting among a plurality of wireless devices 11 having the same physical quantities of the objects to be measured.

A case has been described in the above embodiments as an example where the management apparatus 13 manages the wireless network N1 formed in the plant. However, the wireless network managed by the management apparatus 13 is not limited to the wireless network formed in the plant. For example, the wireless network may be a wireless network formed in places far from inner cities such as mines, mountainous areas, the sea and construction sites where there are fewer base stations for mobile phones (e.g., LPWAN including wireless communication compliant with wireless communication standard LoRa® (LoRa is a registered trademark in Japan, other countries, or both) WAN). Note that LPWAN including wireless communication compliant with wireless communication standard LoRa WAN can also be used for the wireless network N1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A setting system comprising:
a hardware portable medium that records:
at least one of first setting information and second setting information generated by a management apparatus that manages a wireless network; and
setting instruction information that defines which of the first setting information or the second setting information is set, and
an information terminal apparatus that:
acquires the first setting information or the second setting information from the hardware portable medium; and
sets, based on the setting instruction information, the acquired first or second setting information in a wireless device that joins the wireless network, wherein
the first setting information is commonly set in the wireless device and the second setting information is individually set for each wireless device, and
the information terminal apparatus acquires identification information of the wireless device from the wireless device through short distance communication and sets the first setting information or the second setting information in the wireless device based on the acquired identification information.

2. The setting system according to claim 1, wherein:
the first setting information is generated for each management apparatus and commonly set in the wireless device that joins the wireless network; and
the information terminal apparatus sets, in the wireless device, the first setting information identified by identification information of the management apparatus.

3. The setting system according to claim 1, wherein:
the second setting information is generated for each wireless device and individually set for each wireless device that joins the wireless network; and
the information terminal apparatus sets, in the wireless device, the second setting information identified by identification information of the wireless device.

4. The setting system according to claim 1, wherein:
the hardware portable medium further records time information indicating a time to delete the first setting information or the second setting information; and
the information terminal apparatus acquires the time information in addition to the first setting information or the second setting information from the hardware portable medium and deletes the first setting information or the second setting information when the time indicated by the time information elapses after acquiring the first setting information or the second setting information.

5. The setting system according to claim 1, wherein the information terminal apparatus sets a time to delete the acquired first or second setting information in accordance with an inputted instruction and deletes the first setting information or the second setting information after the set time elapses.

6. The setting system according to claim 1, wherein:
the hardware portable medium further records measurement setting information to measure a physical quantity; and
the information terminal apparatus acquires the measurement setting information in addition to the first setting information or the second setting information from the hardware portable medium, and sets the acquired measurement setting information in the wireless device.

7. A setting system comprising:
an information terminal apparatus that generates first setting information or second setting information for a wireless device that joins a wireless network managed by a management apparatus, and sets the generated first or second setting information in the wireless device; and
a hardware portable medium that records:
at least one of the generated first and second setting information to be set in the management apparatus; and setting instruction information that defines which of the first setting information or the second setting information is set, wherein the first setting information is commonly set in the wireless device and the second setting information is individually set for each wireless device, and the information terminal apparatus acquires identification information of the wireless device from the wireless device through short distance communication and sets the first setting information or the second setting information in the wireless device based on the acquired identification information.

8. An information terminal apparatus comprising:
a hardware controller that:
 acquires, from a hardware portable medium:
  first setting information or second setting information generated by a management apparatus that manages a wireless network; and
  setting instruction information that defines which of the first setting information or the second setting information is set; and
 sets, based on the setting instruction information through short distance communication, the acquired first or second setting information in a wireless device that joins the wireless network, wherein
the first setting information is commonly set in the wireless device and the second setting information is individually set for each wireless device, and
the hardware controller acquires identification information of the wireless device from the wireless device through short distance communication and sets the first setting information or the second setting information in the wireless device based on the acquired identification information.

9. A setting method comprising:
recording, in a hardware portable medium,
 at least one of first setting information and second setting information generated by a management apparatus that manages a wireless network; and
 setting instruction information that defines which of the first setting information or the second setting information is set;

acquiring:
 the first or second setting information from the hardware portable medium; and
 the setting instruction information; and
setting, based on the setting instruction information, the acquired first or second setting information in a wireless device that joins the wireless network, wherein
the first setting information is commonly set in the wireless device and the second setting information is individually set for each wireless device, and
the setting method further comprises:
 acquiring identification information of the wireless device from the wireless device through short distance communication; and
 setting the first setting information or the second setting information in the wireless device based on the acquired identification information.

10. A non-transitory computer-readable recording medium including computer program instructions, which when executed by a computer, cause the computer to:
acquire, from a hardware portable medium:
 first setting information or second setting information generated by a management apparatus that manages a wireless network; and
 setting instruction information that defines which of the first setting information or the second setting information is set; and
set, based on the setting instruction information, the acquired first or second setting information in a wireless device that joins the wireless network through short distance communication, wherein
the first setting information is commonly set in the wireless device and the second setting information is individually set for each wireless device, and
the computer program instructions further cause the computer to:
 acquire identification information of the wireless device from the wireless device through short distance communication; and
 set the first setting information or the second setting information in the wireless device based on the acquired identification information.

* * * * *